United States Patent
Xhafa et al.

(10) Patent No.: US 12,550,127 B2
(45) Date of Patent: Feb. 10, 2026

(54) EFFICIENT UNICAST SUPER FRAME COMMUNICATIONS

(71) Applicant: TEXAS INSTRUMENTS INCORPORATED, Dallas, TX (US)

(72) Inventors: Ariton E. Xhafa, Plano, TX (US); Arvind Kandhalu, Frisco, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 867 days.

(21) Appl. No.: 17/828,895

(22) Filed: May 31, 2022

(65) Prior Publication Data
US 2023/0388980 A1   Nov. 30, 2023

(51) Int. Cl.
| | |
|---|---|
| H04W 72/0446 | (2023.01) |
| B60L 58/16 | (2019.01) |
| H02J 7/00 | (2006.01) |
| H04L 5/00 | (2006.01) |
| H04W 72/30 | (2023.01) |

(52) U.S. Cl.
CPC ......... H04W 72/0446 (2013.01); B60L 58/16 (2019.02); H02J 7/00032 (2020.01); H04L 5/0044 (2013.01); H04W 72/30 (2023.01); B60L 2240/545 (2013.01); B60L 2240/547 (2013.01); H02J 7/0013 (2013.01)

(58) Field of Classification Search
CPC ... H04W 72/0446; H04W 72/30; B60L 58/16; B60L 2240/545; B60L 2240/547; B60L 3/12; H02J 7/00032; H02J 7/0013; H04L 5/0044; H04L 5/0048; H04L 67/12; H04L 5/0053; H04L 5/0055
See application file for complete search history.

(56) References Cited

U.S. PATENT DOCUMENTS

| | | | |
|---|---|---|---|
| 2008/0186935 A1* | 8/2008 | Ling | ..................... H04L 5/0041 370/342 |
| 2010/0259221 A1 | 10/2010 | Tabatowski-Bush | |

(Continued)

FOREIGN PATENT DOCUMENTS

| | | |
|---|---|---|
| CN | 113840383 A | 12/2021 |
| WO | WO-2023245518 A1 * | 12/2023 |

OTHER PUBLICATIONS

David Lara et al., "Using wireless technologies to replace cables in automotive access and battery management systems", Texas Instruments, Sep. 28, 2020 [retrieved on Sep. 1, 2023]. Retrieved from: <URL: https://www.ti.com/video/6195177190001> pp. 6-26.

(Continued)

*Primary Examiner* — Chae S Lee
(74) *Attorney, Agent, or Firm* — Carl G. Peterson; Frank D. Cimino

(57) ABSTRACT

In some examples, a vehicular battery management system (BMS) comprises a set of battery cells and a secondary network node coupled to the set of battery cells. The secondary network node is configured to wirelessly receive, in a first slot of a super frame, a unicast downlink packet from a primary network node, the unicast downlink packet addressed to the secondary network node. The secondary network node is also configured to wirelessly transmit, in a second slot of the super frame and responsive to the unicast downlink packet, an uplink packet to the primary network node.

20 Claims, 12 Drawing Sheets

(56) References Cited

U.S. PATENT DOCUMENTS

| | | |
|---|---|---|
| 2020/0396688 A1 | 12/2020 | Hong |
| 2021/0306993 A1* | 9/2021 | Raza .................... H04J 3/0661 |
| 2021/0313626 A1 | 10/2021 | Deng |
| 2022/0070613 A1* | 3/2022 | Barton ................ H04W 72/56 |
| 2023/0122950 A1* | 4/2023 | Wei .................... H04W 72/232 |
| | | 370/329 |

OTHER PUBLICATIONS

International Search Report for Corresponding Application No. PCT/US2023/023957, mailed Sep. 18, 2023.

* cited by examiner

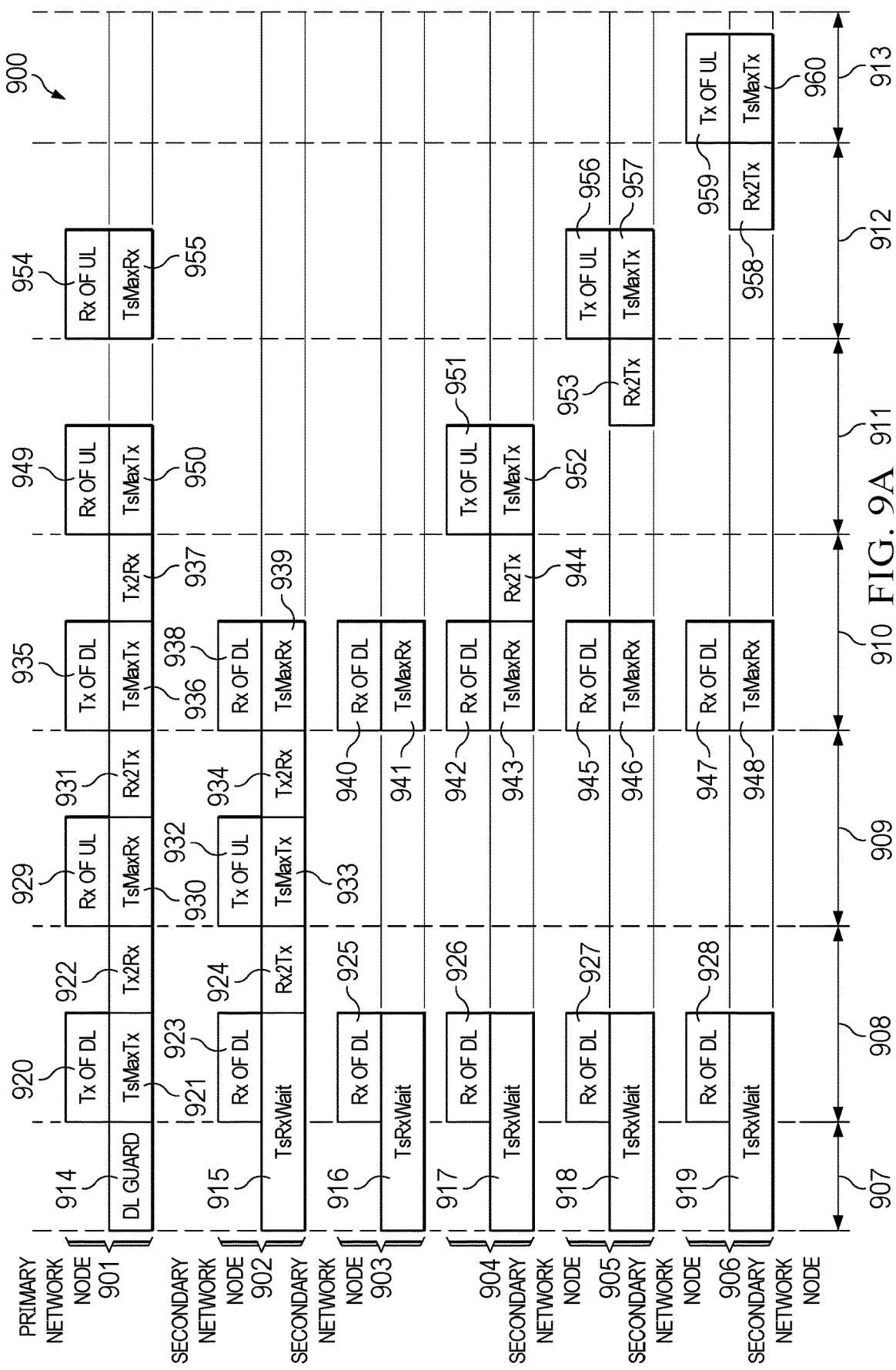

EFFICIENT UNICAST SUPER FRAME COMMUNICATIONS

BACKGROUND

Modern vehicles may include multiple battery cells. Information associated with the cells, such as temperature, voltage, and other indicators of cell status and health, may be monitored for vehicular safety and to ensure proper operation.

SUMMARY

In some examples, a vehicular battery management system (BMS) comprises a set of battery cells and a secondary network node coupled to the set of battery cells. The secondary network node is configured to wirelessly receive, in a first slot of a super frame, a unicast downlink packet from a primary network node, the unicast downlink packet addressed to the secondary network node. The secondary network node is also configured to wirelessly transmit, in a second slot of the super frame and responsive to the unicast downlink packet, an uplink packet to the primary network node.

In some examples, a method comprises a primary network node transmitting, in a first super frame, a unicast downlink packet to a first secondary network node of a set of secondary network nodes and a broadcast downlink packet to the set of secondary network nodes. The method also comprises the primary network node receiving, in the first super frame and responsive to the unicast downlink packet, an uplink packet from the first secondary network node. The method also comprises the primary network node receiving, in the first super frame and responsive to the broadcast downlink packet, additional uplink packets from fewer than all of the secondary network nodes in the set of secondary network nodes.

BRIEF DESCRIPTION OF THE DRAWINGS

FIGS. 8, 9A, and 9B are illustrations of super frame intervals usable by a wireless battery management system according to various examples.

DETAILED DESCRIPTION

Figure 1:
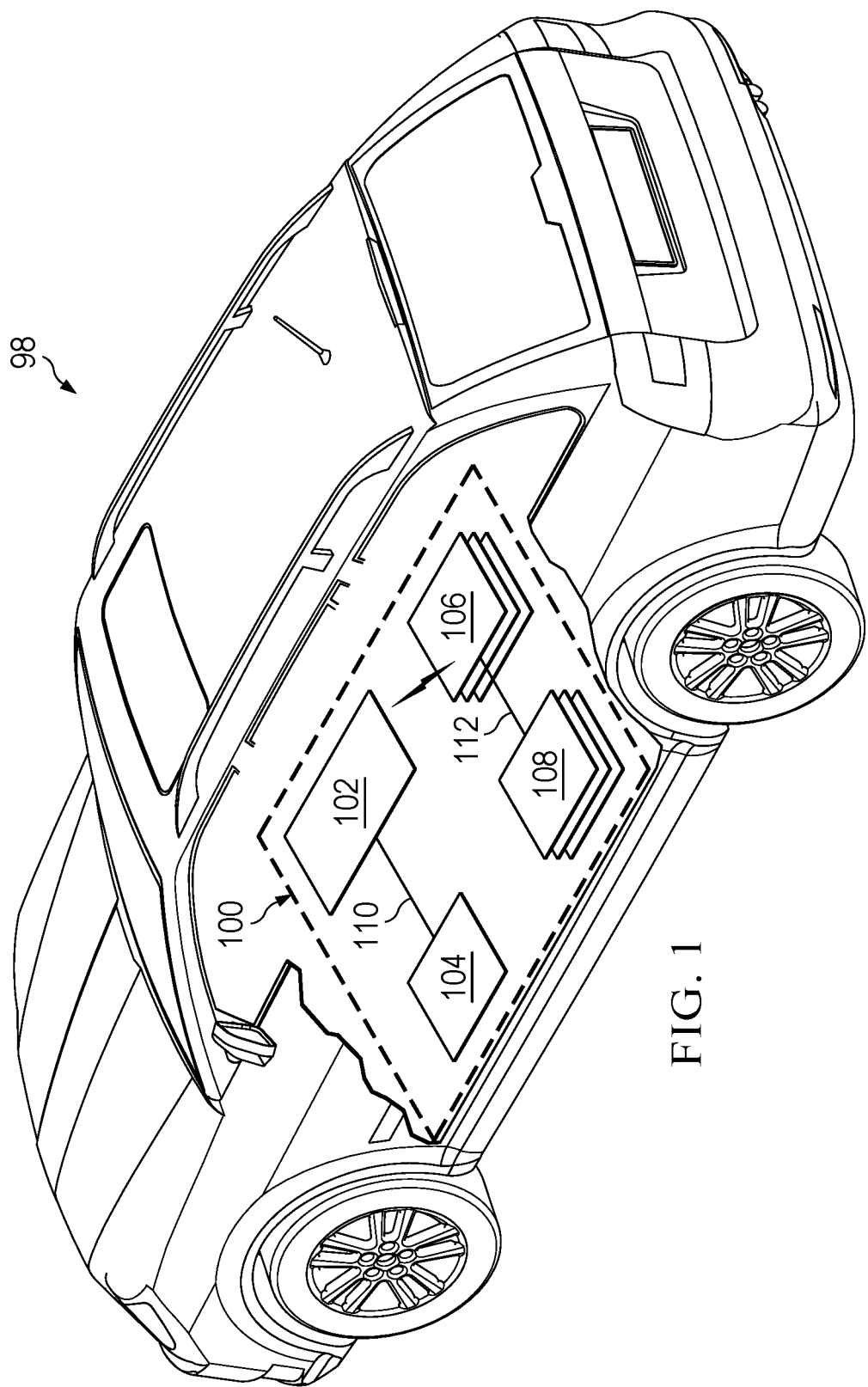
FIG. 1 is a block diagram of a wireless battery management system according to various examples.

Some electronic devices operate using batteries. For example, electric vehicles include multiple battery cells that provide power to those vehicles. Because battery cells in an electronic device can provide large amounts of power, and further because the power provided by the battery cells may be vital to the operation of the electronic device, the electronic device may include a system to manage the battery cells.

Battery management systems (BMSs) may manage the battery cells of an electronic device in various ways. For example, a BMS may monitor the health (e.g., voltage, current, temperature) of battery cells in an electronic device. Further, the BMS may control various battery cells to manage the quantity of power provided by the battery cells and where that power is directed within the electronic device. Generally, a BMS includes multiple components, such as multiple battery modules and a controller to manage the battery modules. Each battery module, in turn, may couple to multiple battery cells and include a battery monitor to monitor those battery cells. Thus, the battery cells coupled to a battery module provide power to the electronic device; the battery monitor in the battery module monitors the health and operation of the battery cells in that battery module; and the controller communicates with the battery monitor to ensure the battery module and its cells are operating properly. The controller may also communicate with the battery monitor to control the operation of the battery cells, such as to turn on, turn off, redirect, or otherwise balance the power provided by those battery cells.

BMSs may incorporate wireless technology. For example, a primary network node contains or is coupled to a controller and a secondary network node contains a battery module that controls multiple battery cells. The primary and secondary network nodes may communicate with each other wirelessly, for example using radio frequencies. In some protocols, a super frame is useful to facilitate wireless communications between the primary and secondary network nodes. In the super frame, the primary network node first broadcasts a downlink communication (or packet) to multiple secondary network nodes. The secondary network nodes individually respond to the primary network node with uplink communications (or packets) in a serial manner.

In some cases, however, it is desirable for the primary network node to transmit a unicast downlink communication (or packet) rather than a broadcast downlink communication. A unicast downlink packet is transmitted by the primary network node to one specific secondary network node instead of being broadcast to all of the secondary network nodes. After the primary network node unicasts a downlink packet to a specific secondary network node, only that secondary network node to which the unicast downlink packet was addressed responds to the primary network node with an uplink packet. The remaining secondary network nodes to which the unicast downlink packet was not addressed do not respond to the primary network node. Consequently, after the secondary network node transmits its uplink packet to the primary network node, the remainder of the super frame—which, in the context of a broadcast, would ordinarily be used by the remaining secondary network nodes to transmit their uplink packets as described above—goes unused, and no additional communications occur until the next super frame interval. Unicast super frame communications can be very inefficient.

Described herein are various examples of a BMS that enables efficient unicast super frame communications. Specifically, an example BMS includes a primary network node and a set of secondary network nodes, with each secondary network node coupled to a set of battery cells (although the scope of this disclosure is not limited to battery applications). The primary network node controls the secondary network nodes, and the secondary network nodes communicate with their respective battery cells to control the battery cells and to receive status information about the battery cells (e.g., current, voltage, temperature) that may be communicated to the primary network node. The primary and secondary network nodes communicate with each other using super frame intervals.

In a first slot (also known as a frame) of a super frame, the primary network node may transmit a unicast downlink packet to a target secondary network node in the set of secondary network nodes. For example, the unicast downlink packet may include an address of the target secondary network node. In a second slot of the super frame, the secondary network node may transmit a response to the primary network node in the form of an uplink packet. The remainder of the super frame may be utilized for unicast and/or broadcast communications, thereby mitigating the inefficiencies that would result if the remainder of the super frame were to be unused. For example, in a third slot of the super frame, the primary network node may unicast a downlink packet to a specific secondary network node, and in a fourth slot of the super frame, the secondary network node may respond by transmitting an uplink packet to the primary network node. Alternatively, in the third slot of the super frame, the primary network node may broadcast a downlink packet to the set of secondary network nodes, and from the fourth slot of the super frame to the final slot of the super frame, the secondary network nodes may respond by serially transmitting their respective uplink packets to the primary network node. In this way, the secondary network nodes may be configured to implement on-the-fly or dynamic scheduling of the responsive uplink packets. Because the primary network node broadcasts its downlink packet in the fourth slot of the super frame instead of in the first slot of the super frame, there may be an insufficient number of slots remaining after the fourth slot for all of the secondary network nodes to transmit their respective uplink packet responses. Accordingly, any uplink packets that are not transmitted to the primary network node in the super frame may instead be transmitted to the primary network node in a second super frame. By distributing broadcast downlink and uplink packets across multiple super frames in this manner, super frame slots that would otherwise go unused after an uplink communication are used, thereby significantly mitigating the inefficiencies that would otherwise be inherent in unicast super frame communications.

FIG. 1 is a perspective view of an example system 98, such as an automotive vehicle, that includes a wireless battery management system (WBMS) 100. In some examples, the system 98 is any system that may include a wireless battery management system to supply power to one or more components of the system 98. As shown, the wireless battery management system 100 includes a primary network node 102, a battery controller 104, a plurality of secondary network nodes 106, and a plurality of battery cells 108. In an example, the wireless battery management system 100 may include a plurality of primary network nodes. Although this disclosure describes communication techniques primarily in the context of wireless systems, these techniques may also be useful for wired systems (e.g., where the connection between nodes 102 and 106 is wired).

In an example, the primary network node 102 is coupled to the battery controller 104 using a first wired connection 110. In an example, the first wired connection 110 between the primary network node 102 and the battery controller 104 is a universal asynchronous receiver/transmitter (UART), inter-integrated circuit (I2C), or the like. The secondary network nodes 106 are wirelessly coupled to the primary network node 102 and coupled to the battery cells 108 using a second wired connection 112.

In an example, the wireless battery management system 100 provides wireless radio frequency (RF) communication between the primary network node 102 and the secondary network nodes 106. In an example, the wireless RF communication uses the license-free 2.4 gigahertz (GHz) industrial, scientific, and medical (ISM) band from 2.4 GHz to 2.483 GHz, which is compliant with BLUETOOTH special interest group (SIG). In examples, the wireless battery management system 100 uses 2 megabits per second (Mbps) BLUETOOTH low energy (BLE) across the physical layer (PHY). The Open Systems Interconnection (OSI) model includes the PHY as a layer used for communicating raw bits over a physical medium. In this case, the PHY is free space, which the wireless battery management system 100 uses to wirelessly communicate between the primary network node 102 and the secondary network nodes 106. In an example, the transmission power of the wireless battery management system 100 is less than or equal to 10 decibel-milliwatts (dBm).

In an example, the wireless RF communication between the primary network node 102 and the secondary network nodes 106 utilizes frequency hopping and time slotted allocations to transmit and receive data across super frames (SFs). A super frame, also referred to as a super frame interval, is a time interval including time and frequency allocations for data exchanges between the primary network node 102 and the secondary network nodes 106, including interframe spacing between these allocations. Frequency hopping includes transmitting RF signals by rapidly changing the transmission frequency among many distinct frequencies occupying a spectral band. In an example, frequency hopping occurs based on a linear shift-back register and a master identification (ID) of the primary network node 102. The linear shift-back register uses linear bit rotation to indicate a pattern of frequencies on which the primary network node 102 and the secondary network nodes 106 will communicate. Time slotted allocations are time slots that are assigned either to the primary network node 102 or one or more of the secondary network nodes 106 for transmitting to either one or more of the secondary network nodes 106 or the primary network node 102. The time slotted allocations occur in a half-duplex mode, as both the primary network node 102 and the secondary network nodes 106 switch between transmit and receive modes according to the temporal moment specified in scan/pairing frames of exchanged data for downlink (DL)/uplink (UL) durations.

In an example, the wireless battery management system 100 uses frequency division multiple access (FDMA) and changes the frequency at which frames are transmitted between the primary network node 102 and the secondary network nodes 106 to increase robustness against interference. In an example, the wireless battery management system 100 uses frequency hopping tables, black listing of frequencies, and configuration channels to mitigate interference with other wireless networks. Frequency hopping occurs on a per super frame (SF) basis, where during the SF, time slotted allocations are used for frame exchange. Black listing is suspending the use of frequency channels that may be susceptible to interference. Configuration channels may be used for scanning, pairing, and negotiating communication between the primary network node 102 and the secondary network nodes 106.

In an example, the wireless RF communication between the primary network node 102 and the secondary network nodes 106 uses 40 channels, where a subset of the 40 channels (e.g., channels 37, 38, and 39) is used for system configuration and the remaining 37 channels are used to exchange data. In an example, a single channel may be used as a configuration channel.

In an example, the wireless battery management system 100 supports periodic and a-periodic data exchanges from the secondary network nodes 106 to the primary network node 102 using wireless RF communication. The primary network node 102 and the secondary network nodes 106 use a common data format structure for both periodic and a-periodic data exchanges. Periodic data exchange occurs based on a repetitive interval, while a-periodic data exchange does not occur based on a repetitive interval. The data format is a description of rules that the data populating a file will follow. Generally, the more thorough the description of the data format, the easier it is for validation rules to be written on both the sending and receiving sides of the wireless battery management system 100.

In an example, the primary network node 102 scans the network to obtain a master ID and discover the secondary network nodes 106. The primary network node 102 scans the network by transmitting a management frame to coordinate medium access, wakeup schedules, and clock synchronization within the secondary network nodes 106. The primary network node 102 also uses the management frame to learn about the secondary network nodes 106 in the network. Initially, the primary network node 102 performs a passive scan to obtain (or check for) a master ID value in use by other nodes and/or devices. The primary network node 102 then selects a master ID that is different from the master IDs used by other nodes and/or devices.

In an example, after the primary network node 102 has selected a master ID, the primary network node 102 transmits a scan request frame in every SF period as long as there are unconnected secondary network nodes 106 from the primary network node 102. In an example, the primary network node 102 is programmed with the total number of the secondary network nodes 106 to be connected to the primary network node 102. After all the secondary network nodes 106 are connected and confirmed, the primary network node 102 will not transmit any more scan requests. The scan request frames include information about the structure of the SF and the frame formatting of the DL and UL slots.

For the primary network node 102 to scan for the secondary network nodes 106, the primary network node 102 enters a scan state. In this state, the primary network node 102 transmits a scan request frame in every SF period. The secondary network nodes 106 reply to the primary network node 102 with a scan response and await a pairing request frame from the primary network node 102. After the secondary network nodes 106 receive the pairing request, the secondary network nodes 106 respond within the same SF in the frequency slot assigned by the primary network node 102. In examples, this exchange occurs in the configuration channels. No data exchanges occur in this state. Additional example details of establishing a communication channel can be found in commonly assigned U.S. patent application Ser. No. 17/233,106, entitled "Wireless Protocol for Battery Management," filed on Apr. 16, 2021; and U.S. patent application Ser. No. 17/399,793, entitled "Wireless Battery Management System Setup," filed on Aug. 11, 2021, each of which is incorporated by reference in its entirety.

In an example, transmission cycles or SFs depend on the number of secondary network nodes 106 and/or battery cells 108 in the network. The primary network node 102 determines the SF interval based on the number of secondary network nodes 106. Given a number of secondary network nodes 106, the primary network node 102 estimates the number of DL slots usable to transmit the packets to the secondary network nodes 106. Accordingly, the total number of slots in the communication time interval becomes the following:

$$Total\_slots = nr\_of\_WD + nr\_DL\_slots,$$

where nr_of_WD is the number of secondary network devices and nr_DL_slots is the number of DL slots available to the secondary network devices.

The wireless battery management system 100 manages the battery cells 108 using the primary network node 102, the battery controller 104, and the secondary network nodes 106. The primary network node 102 and the secondary network nodes 106 communicate with each other about the state of the battery cells 108. The primary network node 102 and the secondary network nodes 106 may communicate with each other using various protocol formats. For example, the primary network node 102 and the secondary network nodes 106 use a DL protocol format and a UL protocol format, where each of the DL protocol format and the UL protocol format includes a frame control field to communicate battery management information. When the battery cells 108 notify the secondary network nodes 106 of a condition, the secondary network nodes 106 communicate to the primary network node 102 that the condition is present. The primary network node 102 receives the notification of the condition from the secondary network nodes 106 and alerts the battery controller 104 of the condition. The battery controller 104 determines a proper reaction to the condition and sends an instruction to the primary network node 102. The primary network node 102 transmits the instruction to the secondary network nodes 106. The secondary network nodes 106 receive the instruction to manage the battery cells 108 in response to the condition. The secondary network nodes 106 manage the battery cells 108 in response to the condition.

Figure 2A:
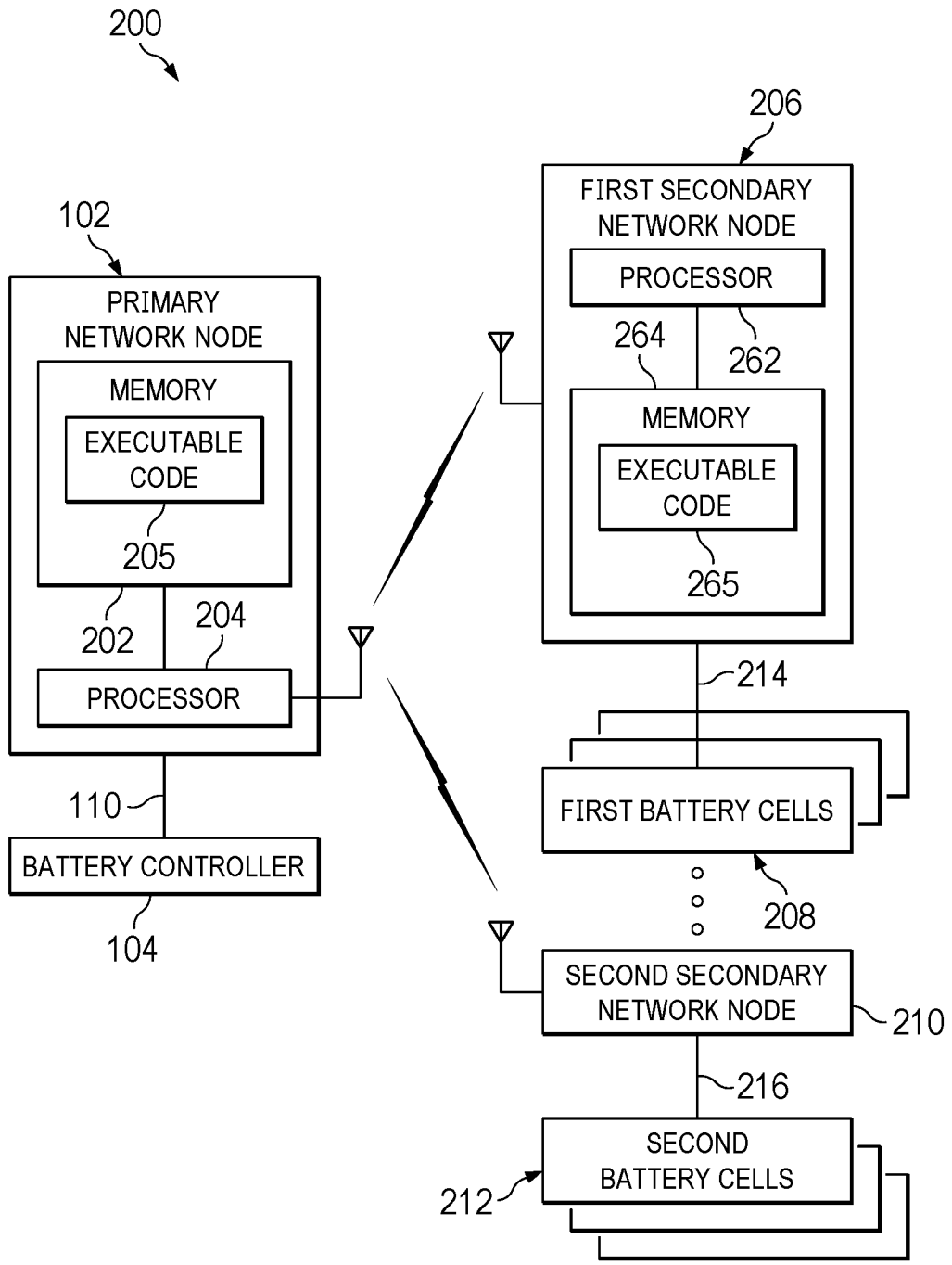
FIG. 2A is a block diagram of a wireless battery management system according to various examples.

FIG. 2A illustrates an example wireless battery management system 200. The wireless battery management system 200 is an example of the wireless battery management system 100 described above. As shown, the wireless battery management system 200 includes the primary network node 102, the battery controller 104, a memory 202, a processor 204, a first secondary network node 206, a first plurality of battery cells 208, a second secondary network node 210, and a second plurality of battery cells 212. Additional secondary network nodes 206, 210 may be included, although they are not expressly shown. The primary network node 102 includes the memory 202 and the processor 204 that is configured to execute code 205 stored on the memory 202 to perform one or more of the actions attributed herein to the primary network node 102. In an example, a portion of the memory 202 may be non-transitory and a portion of the memory 202 may be transitory. The secondary network nodes 206, 210 also may include processors and memory. For example, as shown, the secondary network node 206 includes a processor 262 coupled to a memory 264 storing code 265 that is executable by the processor 262 to perform one or more of the actions attributed herein to the secondary network node 206.

The primary network node 102 is coupled to the battery controller 104 using the first wired connection 110 and is wirelessly coupled to each of the secondary network nodes 206, 210. The first secondary network node 206 is coupled to the first plurality of battery cells 208 using a third wired connection 214 and wirelessly coupled to the primary network node 102. The second secondary network node 210 is coupled to the second plurality of battery cells 212 using a fourth wired connection 216 and wirelessly coupled to the primary network node 102. FIG. 2A does not limit the number of secondary network nodes in the wireless battery management system 200; rather, the naming convention indicates that each of the secondary network nodes is coupled to a plurality of battery cells.

In an example, the primary network node 102 is wirelessly coupled to at least eight secondary network nodes 206, 210. In an example, each of the secondary network nodes 206, 210 can be coupled to at least sixteen battery cells using a wired connection. In examples, the wireless battery management system 200 includes one primary network node. In other examples, the wireless battery management system 200 includes multiple primary network nodes.

The wireless battery management system 200 manages the first plurality of battery cells 208 and the second plurality of battery cells 212 using the primary network node 102, the battery controller 104, the memory 202, the processor 204, the first secondary network node 206, and the second secondary network node 210. Instructions in the memory 202 cause the processor 204 to instruct the primary network node 102 to wirelessly communicate with the first secondary network node 206 and the second secondary network node 210 about the state of the first plurality of battery cells 208 and the second plurality of battery cells 212. The primary network node 102 and the secondary network nodes 206, 210 communicate using various protocol formats. For example, the primary network node 102 and the secondary network nodes 206, 210 use a DL protocol format and a UL protocol format, where each of the DL protocol format and the UL protocol format includes a frame control field to communicate battery management information. When the first plurality of battery cells 208 notify the first secondary network node 206 of a condition, the first secondary network node 206 communicates with the primary network node 102 that the condition is present. The primary network node 102 receives the notification of the condition from the first secondary network node 206 and alerts the battery controller 104 of the condition. The battery controller 104 determines a proper reaction to the condition and sends an instruction to the primary network node 102. The primary network node 102 transmits the instruction to the first secondary network node 206. The first secondary network node 206 receives the instruction to manage the first plurality of battery cells 208 in response to the condition of the first plurality of battery cells 208. The first secondary network node 206 manages the first plurality of battery cells 208 in response to the condition. A similar process may apply to the second secondary network node 210 when a condition is present in the second plurality of battery cells 212.

Figure 2B:
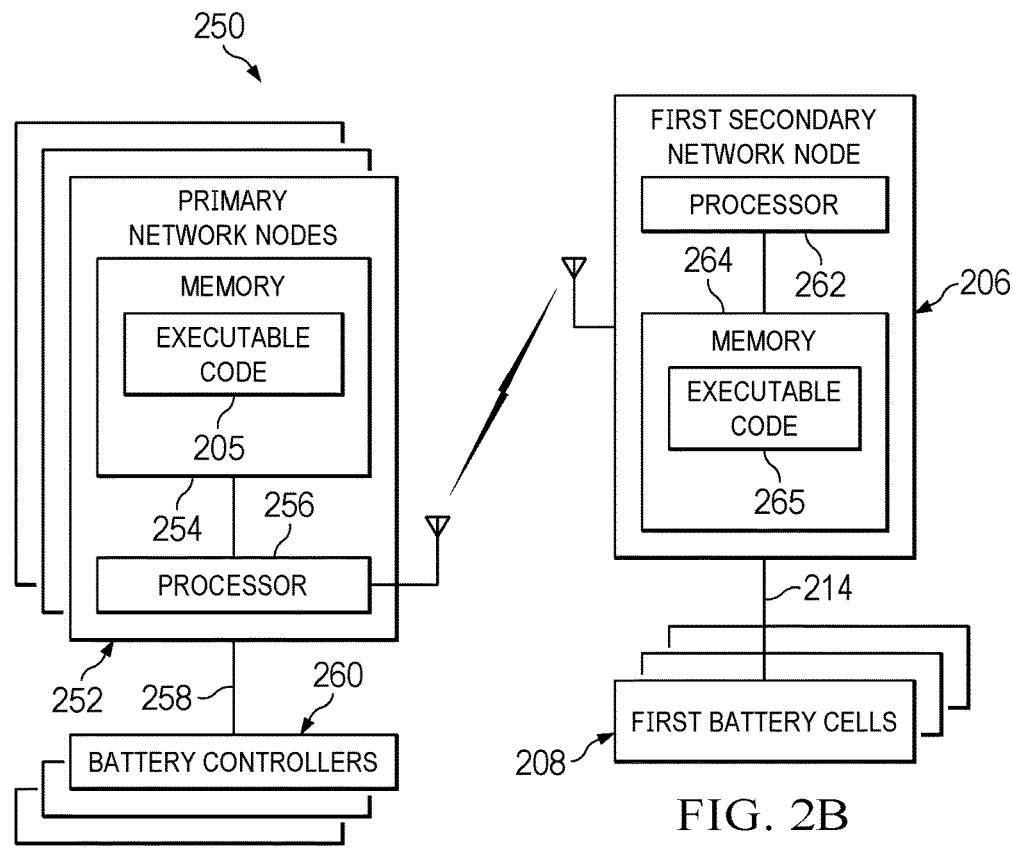
FIG. 2B is a block diagram of a wireless battery management system according to various examples.

FIG. 2B illustrates an example wireless battery management system 250. The wireless battery management system 250 is an example of the wireless battery management system 100 described above. As shown, the wireless battery management system 250 includes the first secondary network node 206, the first plurality of battery cells 208, a plurality of primary network nodes 252, a memory 254, a processor 256, a first wired connection 258, and a plurality of battery controllers 260. The plurality of primary network nodes 252 includes the memory 254 and the processor 256. In an example, a portion of the memory 254 may be non-transitory and a portion of the memory 254 may be transitory. In examples, the memory 254 includes executable code 255 which, when executed by the processor 256, causes the processor 256 to perform the actions attributed herein to the primary network node 252.

The plurality of primary network nodes 252 are coupled to the plurality of battery controllers 260 using the first wired connection 258 and are wirelessly coupled to the secondary network node 206. The first secondary network node 206 is coupled to the first plurality of battery cells 208 using the wired connection 214 and wirelessly coupled to the plurality of primary network nodes 252. As shown in FIG. 2A, the first secondary network node 206 may include a processor and memory (e.g., processor 262 and memory 264). FIG. 2B does not limit the number of secondary network nodes in the wireless battery management system 250. In an example, each of the plurality of primary network nodes 252 is wirelessly coupled to at least eight secondary network nodes. In an example, the first secondary network node 206 can be coupled to at least sixteen battery cells using the fourth wired connection 216.

The wireless battery management system 250 manages the first plurality of battery cells 208 using the plurality of primary network nodes 252, the plurality of battery controllers 260, the memory 254, the processor 256, and the first secondary network node 206. Instructions in the memory 254 cause the processor 256 to instruct the plurality of primary network nodes 252 to wirelessly communicate with the first secondary network node 206 about the state of the first plurality of battery cells 208. The plurality of primary network nodes 252 and the first secondary network node 206 communicate using various protocol formats. For example, the plurality of primary network nodes 252 and the first secondary network node 206 use a DL protocol format and a UL protocol format, where each of the DL protocol format and the UL protocol format includes a frame control field to communicate battery management information. When the first plurality of battery cells 208 notify the first secondary network node 206 of a condition, the first secondary network node 206 communicates with the plurality of primary network nodes 252 that the condition is present. The plurality of primary network nodes 252 receives the notification of the condition from the first secondary network node 206 and alerts the plurality of battery controllers 260 of the condition. The plurality of battery controllers 260 determines a proper reaction to the condition and sends an instruction to the plurality of primary network nodes 252. The plurality of primary network nodes 252 transmits the instruction to the first secondary network node 206. The first secondary network node 206 receives the instruction to manage the first plurality of battery cells 208 in response to the condition of the first plurality of battery cells 208. The first secondary network node 206 manages the first plurality of battery cells 208 in response to the condition.

In an example, the first secondary network node 206 communicates with a first primary network node of the plurality of primary network nodes 252 based on instructions from a master controller (not shown). The first secondary network node 206 can transition communication from the first primary network node to a second primary network node of the plurality of primary network nodes 252. The first primary network node and the second primary network node communicate with each other to coordinate transferring the active connections of the first secondary network node 206 from the first primary network node to the second primary network node. In an example, the first primary network node communicates with the first secondary network node 206 and the second primary network node monitors a status of the first primary network node. The status can indicate whether the first primary network node has power and is operating within normal operating conditions. The first primary network node provides a clock signal to the second primary network node to synchronize communication. The first primary network node and the second primary network node select different frequencies to communicate with the first secondary network node 206. Selecting different frequencies allows the plurality of primary network nodes 252 to minimize interference when communicating to the first secondary network node 206. For example, if the first primary network node were to lose power, or if the status of the first primary network node were to fall out of normal operating conditions, then the second primary network node can connect to the first secondary network node 206 to supplement communication until the first primary network node can operate normally again.

Figure 3:
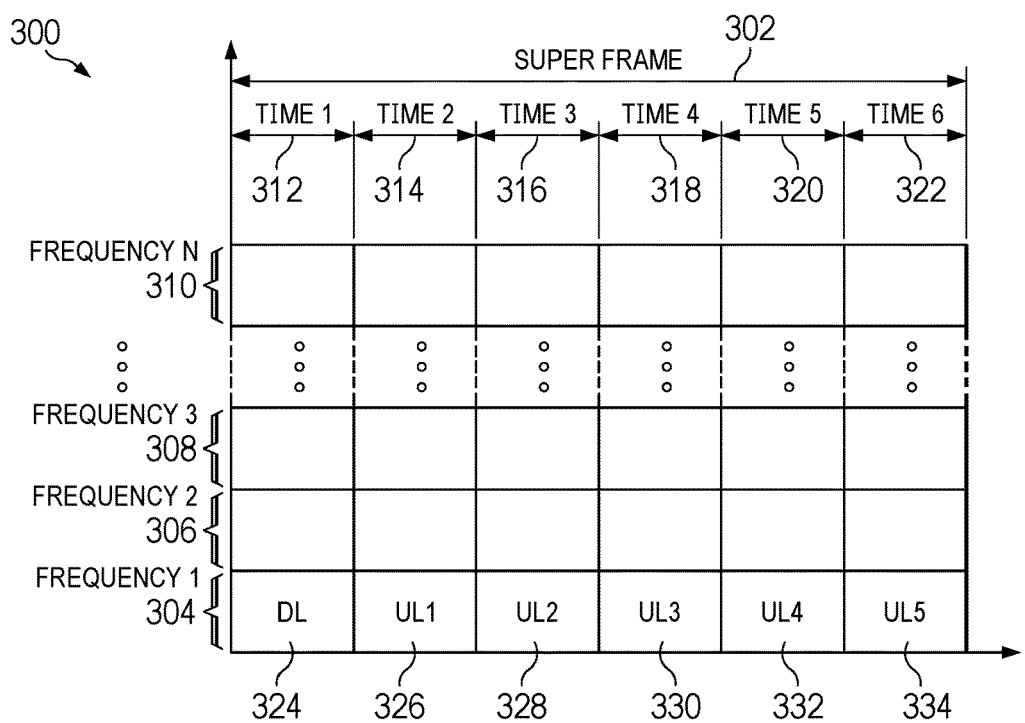
FIG. 3 is an illustration of a communication frame usable by a wireless battery management system according to various examples.

FIG. 3 illustrates a communication frame 300 used by a wireless battery management system, e.g., the wireless battery management system 100. As shown, the communication frame 300 includes an SF 302, a first frequency 304, a second frequency 306, a third frequency 308, and an Nth frequency 310, a first time frame 312, a second time frame 314, a third time frame 316, a fourth time frame 318, a fifth time frame 320, a sixth time frame 322, a DL frame 324, a first UL frame 326, a second UL frame 328, a third UL frame 330, a fourth UL frame 332, and a fifth UL frame 334. Frequency is denoted by the y-axis and time is denoted by the x-axis. Each of the time frames 312, 314, 316, 318, 320, 322 is configurable based on the end application of the wireless battery management system. The frames 312, 314, 316, 318, 320, 322 may also be referred to herein as slots 312, 314, 316, 318, 320, 322, respectively.

The communication frame 300 is used by a wireless battery management system to communicate battery management information between the primary network node and the secondary network nodes. In an example, during the SF 302, the primary network node transmits the DL frame 324 on the first frequency 304 during the first time frame 312. During the first time frame 312, at least one of the secondary network nodes receives the DL frame 324. The DL frame 324 can be transmitted by the primary network node in a broadcast manner or transmitted by the primary network node in a unicast manner. A broadcast includes the primary network node transmitting the DL frame 324 to all of the secondary network nodes in a single time frame. The primary network node may transmit a broadcast packet as a one-to-multiple packet. A unicast includes the primary network node transmitting the DL frame 324 to one of the secondary network nodes during one time frame. The primary network node may transmit a unicast packet as a pair-communication packet. In some examples, the primary network node may be configured to transmit a unicast packet to all of the secondary network nodes in a single time frame, but the primary network node may address the unicast packet to only one of the secondary network nodes. In other words, all of the secondary network nodes may receive the unicast packet, and each of the secondary network nodes may be configured to determine whether the unicast packet is addressed to them.

In an example, a broadcast is used by the primary network node to transmit the DL frame 324 to all of the secondary network nodes during the first time frame 312. A first secondary network node transmits the first UL frame 326 on the first frequency 304 during the second time frame 314 in response to receiving the DL frame 324 from the primary network node. A second secondary network node transmits the second UL frame 328 on the first frequency 304 during the third time frame 316 in response to receiving the DL frame 324 from the primary network node. A third secondary network node transmits the third UL frame 330 on the first frequency 304 during the fourth time frame 318 in response to receiving the DL frame 324 from the primary network node. A fourth secondary network node transmits the fourth UL frame 332 on the first frequency 304 during the fifth time frame 320 in response to receiving the DL frame 324 from the primary network node. A fifth secondary network node transmits the fifth UL frame 334 on the first frequency 304 during the sixth time frame 322 in response to receiving the DL frame 324 from the primary network node. In this example, the SF 302 ends at the end of the sixth time frame 322.

In an example, a unicast is used by the primary network node to transmit the DL frame 324 to a first secondary network node on the first frequency 304 during the first time frame 312. During the first time frame 312, the first secondary network node receives the DL frame 324. The first secondary network node transmits the first UL frame 326 on the first frequency 304 during the second time frame 314 in response to receiving the DL frame 324. In an example where there is a single primary network node and a single secondary network node, the SF 302 ends at the end of the second time frame 314.

In an example, the primary network node and the secondary network nodes may communicate on one of the frequencies other than the first frequency 304, such as the second frequency 306, the third frequency 308, the Nth frequency 310, or the like. A change in the frequency used may be caused by the frequency hopping method in the foregoing discussion. In an example, a length of time of each of the time frames may be different or the same depending on an end application of the wireless battery management system. In an example, the secondary network nodes acknowledge receipt of the DL frame 324 using an acknowledgment code (ACK) and the primary network node acknowledges receipt of the UL frames 326, 328, 330, 332, 334 using an ACK. An ACK is a type of signal (e.g., a bitmap) between a sender and recipient to acknowledge successful receipt of communication. For example, the primary network node may be configured to generate an ACK, where each bit in the ACK is mapped to one of the secondary network nodes.

Figure 4A:
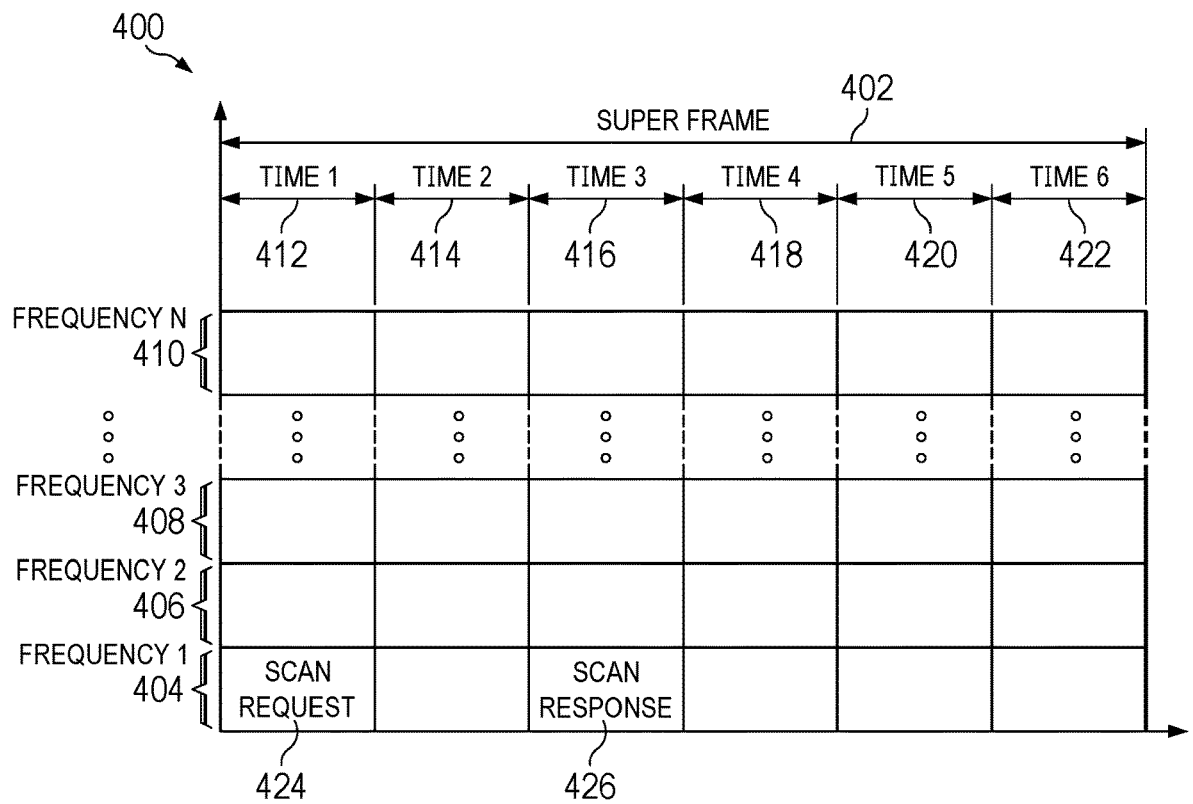
FIG. 4A is an illustration of a scan communication frame usable by a wireless battery management system according to various examples.

FIG. 4A illustrates a scan communication frame 400 used by a wireless battery management system, e.g., the wireless battery management system 100. As shown, the scan communication frame 400 includes an SF 402, a first frequency 404, a second frequency 406, a third frequency 408, and an Nth frequency 410, a first time frame 412, a second time frame 414, a third time frame 416, a fourth time frame 418, a fifth time frame 420, a sixth time frame 422, a scan request frame 424, and a scan response frame 426. Frequency is denoted by the y-axis and time is denoted by the x-axis. And each of the frames is active for a predetermined time. The frames 412, 414, 416, 418, 420, 422 may be referred to herein as slots 412, 414, 416, 418, 420, 422, respectively.

The scan communication frame 400 is used by a wireless battery management system for the primary network node to scan for the secondary network nodes to establish communication. In an example, during the SF 402, the primary network node transmits the scan request frame 424 on the first frequency 404 during the first time frame 412 to the secondary network nodes. During the first time frame 412, the secondary network nodes receive the scan request frame 424. The scan request frame 424 includes information about the structure of the SF 402 and the frame formatting of the DL and UL slots, such as coordination information for communication, wakeup schedules for when the secondary network nodes sleep, and clock synchronization within the primary network node and secondary network nodes. The secondary network nodes transmit the scan response frame 426 to the primary network node on the first frequency 404 during the third time frame 416. The scan response frame 426 includes information indicating whether the secondary network nodes are unconnected from the primary network node and require pairing. Pairing, in this case, involves a procedure used by the primary network node and the secondary network nodes to establish a wireless connection and share security information. Additional example details of pairing can be found in commonly assigned U.S. patent application Ser. No. 17/576,001, entitled "Operating Modes for Testing Monitor Circuits," filed on Jan. 14, 2022, which is incorporated by reference in its entirety.

In an example, the secondary network nodes that are unconnected from the primary network node respond to the scan request frame 424 with the scan response frame 426. A time frame (or slot frame) at which the secondary network nodes start transmitting the scan response frame 426 may be calculated as follows:

$$SlotFrameN = SwitchInfoN + SumBytes(UniqueID(i)) \mod(4*nr\_of\_nodes)$$

where "SwitchInfoN" is the number of SFs in a SwitchInfo field of a protocol format, "UniqueID(i)" is an identifier of one of the secondary network nodes, and "nr_of_nodes" is the number of secondary nodes that are connected to the primary network node. The SwitchInfo field of the protocol format includes the SFs for communication between the primary network nodes and the secondary network nodes.

Figure 4B:
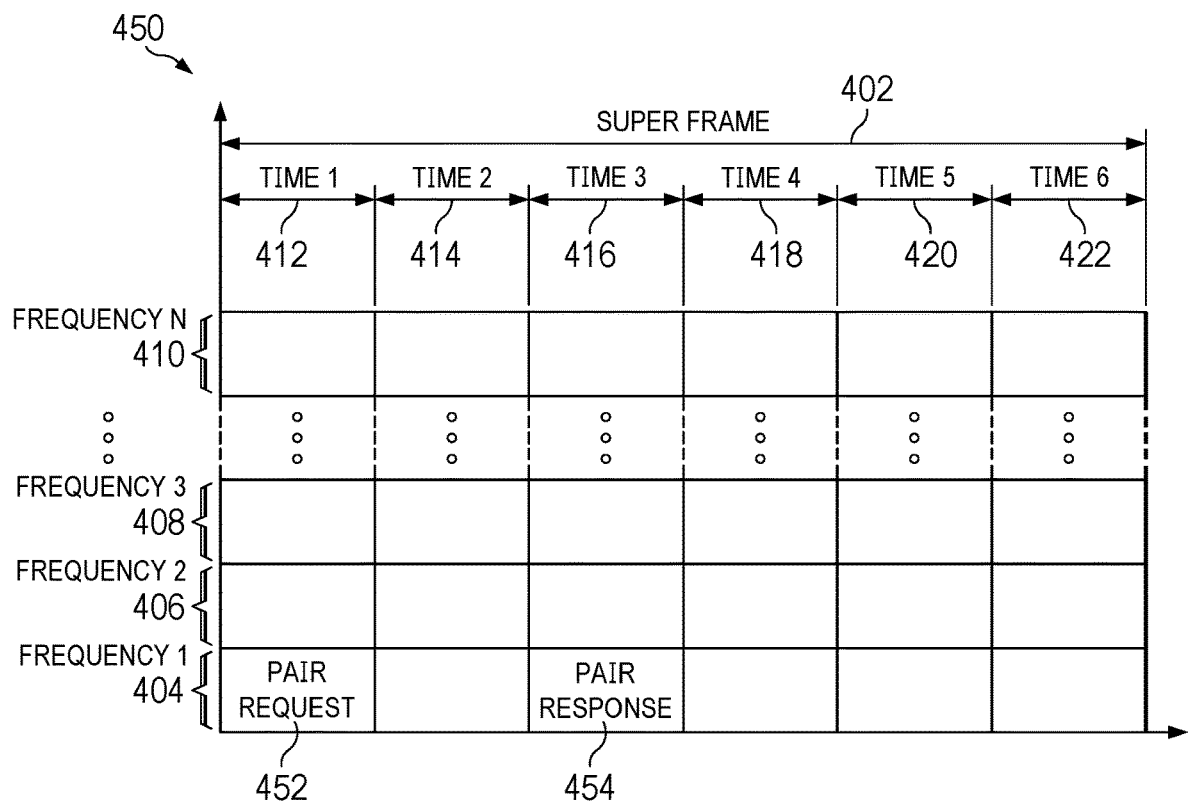
FIG. 4B is an illustration of a pairing communication frame usable by a wireless battery management system according to various examples.

FIG. 4B illustrates a pairing communication frame 450 used by a wireless battery management system, e.g., the wireless battery management system 100. As shown, the pairing communication frame 450 includes an SF 402, a first frequency 404, a second frequency 406, a third frequency 408, and an Nth frequency 410, a first time frame 412, a second time frame 414, a third time frame 416, a fourth time frame 418, a fifth time frame 420, a sixth time frame 422, a pair request frame 452, and a pair response frame 454. Frequency is denoted by the y-axis and time is denoted by the x-axis. Each of the frames is active for a predetermined time.

The pairing communication frame 450 is used by a wireless battery management system to pair the primary network node and the secondary network nodes to establish communication. In an example, during the SF 402, the primary network node transmits the pair request frame 452 on the first frequency 404 during the first time frame 412 to one of the secondary network nodes that is unconnected to the primary network node. The pair request frame 452 includes connection parameters for the secondary network nodes that are unconnected to the primary network node such as time frames to be used for UL/DL, channel hopping information, and security information. After the secondary network node receives the pair request frame 452, the secondary network node responds with the pair response frame 454. The pair response frame 454 indicates successful pairing between the primary network node and the secondary network nodes.

In an example, the primary network node transmits the pair request frame 452 to more than one of the secondary network nodes. If the primary network node transmits the pair request frame 452 to more than one of the secondary network nodes, then there will be purposeful delays in pairing between the primary network node and the secondary network nodes. The delays in pairing will be to ensure network timing between the primary network node and the secondary network nodes is consistent across the secondary network nodes. The delays between pairing gives the primary network node enough time to establish communication with each of the secondary network nodes. Having the network timing consistent across the secondary network nodes allows synchronous communication between the primary network node and the secondary network nodes.

Figure 5:
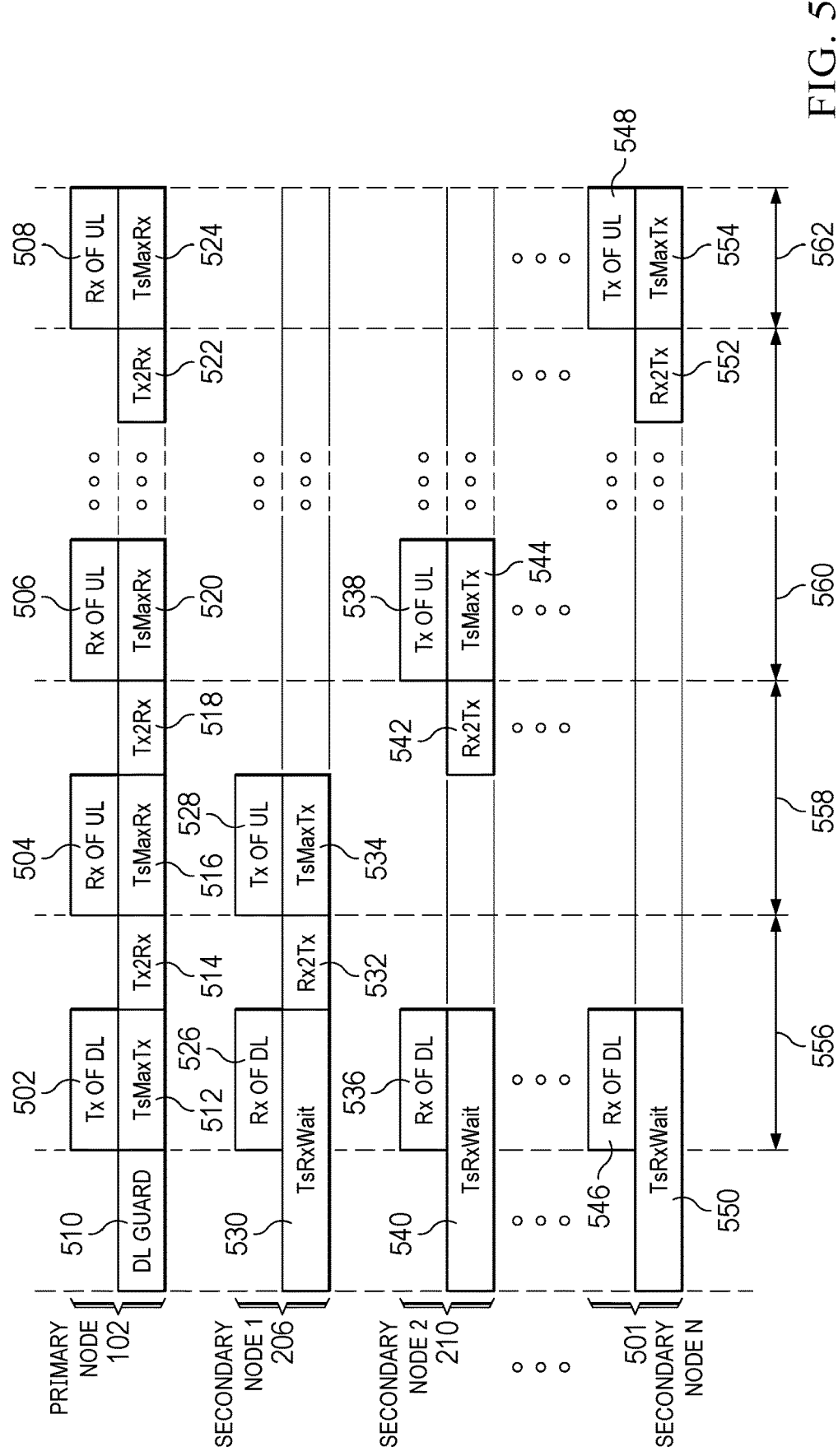
FIG. 5 is an illustration of a super frame interval usable by a wireless battery management system according to various examples.

FIG. 5 illustrates an example super frame interval 500 usable by a wireless battery management system, e.g., the wireless battery management system 100. The term TsMaxRx denotes the maximum (Max) time (Ts) allocated for receiving a packet (Rx), and the term TsMaxTx denotes the maximum (Max) time (Ts) allocated for transmitting a packet (Tx). The primary network node 102 communicates with the first secondary network node 206, the second secondary network node 210, and an Nth secondary network node 501 using, for example, the super frame interval 500. As shown, the super frame interval 500 includes a DL transmit frame 502, a first UL receive frame 504, a second UL receive frame 506, a third UL receive frame 508, a DL guard frame 510, a DL transmit time frame 512, a first transmit to receive frame 514, a first UL receive time frame 516, a second transmit to receive frame 518, a second UL receive time frame 520, a third transmit to receive frame 522, a third UL receive time frame 524, a first DL receive frame 526, a first UL transmit frame 528, a first receive wait time 530, a first receive to transmit frame 532, a first UL transmit time frame 534, a second DL receive frame 536, a second UL transmit frame 538, a second receive wait time 540, a second receive to transmit frame 542, a second UL transmit time frame 544, a third DL receive frame 546, a third UL transmit frame 548, a third receive wait time 550, a third receive to transmit frame 552, a third UL transmit time frame 554, a first frame 556, a second frame 558, a third frame 560, and a fourth frame 562. The frames 556, 558, 560, and 562 may be referred to herein as slots 556, 558, 560, and 562, respectively.

The super frame interval 500 is used by a wireless battery management system to organize communication between the primary network node 102 and the secondary network nodes 106 for wireless battery management purposes. In an example, the super frame interval 500 is a medium access control (MAC) for data exchange between the primary network node 102 and the first secondary network node 206, the second secondary network node 210, and the Nth secondary network node 501. Each of the secondary network nodes 206, 210, 501 in the super frame interval 500 communicates with the primary network node 102 during a time slot as discussed with reference to FIG. 3. The primary network node 102 identifies which secondary network nodes 206, 210, 501 to communicate with based on an availability of the secondary network nodes 206, 210, 501. The availability of the secondary network nodes 206, 210, 501 is determined by a scanning process as described with reference to FIG. 4A. The time slot for the secondary network nodes 206, 210, 501 to communicate with the primary network node 102 is assigned when the primary network node 102 and the secondary network nodes 206, 210, 501 are paired as described with reference to FIG. 4B.

In an example, the super frame interval 500 starts with the DL guard frame 510. The DL guard frame 510 is a time period used to ensure there is no interference between subsequent SFs. At the time of the DL guard frame 510, the first secondary network node 206 enters the first receive wait time 530, the second secondary network node 210 enters the second receive wait time 540, and the Nth secondary network node 501 enters the third receive wait time 550.

In the first frame 556 of the super frame interval 500, after the DL guard frame 510, the primary network node 102 transmits the DL using the DL transmit frame 502 during the DL transmit time frame 512 to all of the secondary network nodes 206, 210, 501. In an example, the first frame 556 is the first time frame 312 as discussed with respect to FIG. 3. The first secondary network node 206 receives the DL using the first DL receive frame 526, the second secondary network node 210 receives the DL using the second DL receive frame 536, and the Nth secondary network node 501 receives the DL using the third DL receive frame 546. After the DL transmit frame 502, the primary network node 102 enters the first transmit to receive frame 514 in preparation to receive the ULs from each of the secondary network nodes 206, 210, 501. At the same time as the primary network node 102 enters the first transmit to receive frame 514, the first secondary network node 206 enters the first receive to transmit frame 532 in preparation to transmit a first UL to the primary network node 102.

In the second frame 558 of the super frame interval 500, the first secondary network node 206 transmits the first UL using the first UL transmit frame 528 and during the first UL transmit time frame 534. In an example, the second frame 558 is the second time frame 314 as discussed with respect to FIG. 3. The primary network node 102 receives the first UL using the first UL receive frame 504 and during the first UL receive time frame 516. In the second frame 558, the primary network node 102 enters the second transmit to receive frame 518 in preparation to receive a second UL from the second secondary network node 210. And the second secondary network node 210 enters the second receive to transmit frame 542 in preparation to transmit a second UL to the primary network node 102.

In the third frame 560 of the super frame interval 500, the second secondary network node 210 transmits the second UL using the second UL transmit frame 538 and during the second UL transmit time frame 544. In an example, the third frame 560 is the third time frame 316 as discussed with respect to FIG. 3. The primary network node 102 receives the second UL using the second UL receive frame 506 and during the second UL receive time frame 520. In the third frame 560, the primary network node 102 enters the third transmit to receive frame 522 in preparation to receive a third UL from the Nth secondary network node 501. And the Nth secondary network node 501 enters the third receive to transmit frame 552 in preparation to transmit a third UL to the primary network node 102.

In the fourth frame 562 of the super frame interval 500, the Nth secondary network node 501 transmits the third UL using the third UL transmit frame 548 and during the third UL transmit time frame 554. In an example, the fourth frame 562 is the sixth time frame 322 as discussed with respect to FIG. 3. The primary network node 102 receives the third UL using the third UL receive frame 508 and during the third UL receive time frame 524. The schedule of frames 528, 538, and 548 shown in FIG. 5 may be referred to herein as a default uplink packet transmission schedule.

In an example, the super frame interval 500 lacks any ACK packets, rather, acknowledgement information is within the DL frame and in the UL frames. Keeping the acknowledgement information within the DL frame and the UL frames allows for enhanced efficiency (throughput) while reducing latency for data transmissions. In an example, any of the UL transmit frames 528, 538, 548 can be retransmitted by the secondary network nodes 206, 210, 501 based on an ACK from the primary network node 102 for one of the frames of the super frame interval 500. In an example, the DL transmit frame 502 can be retransmitted by the primary network node 102 based on ACK information from the secondary network nodes 206, 210, 501.

In an example, the transmissions of each of the frames of the super frame interval 500 can be at the same frequency or at different frequencies. If the transmissions are at different frequencies, the change in frequency is based on a hopping sequence for the communication of the primary network node 102 and the secondary network nodes 206, 210, 501.

Figure 6:
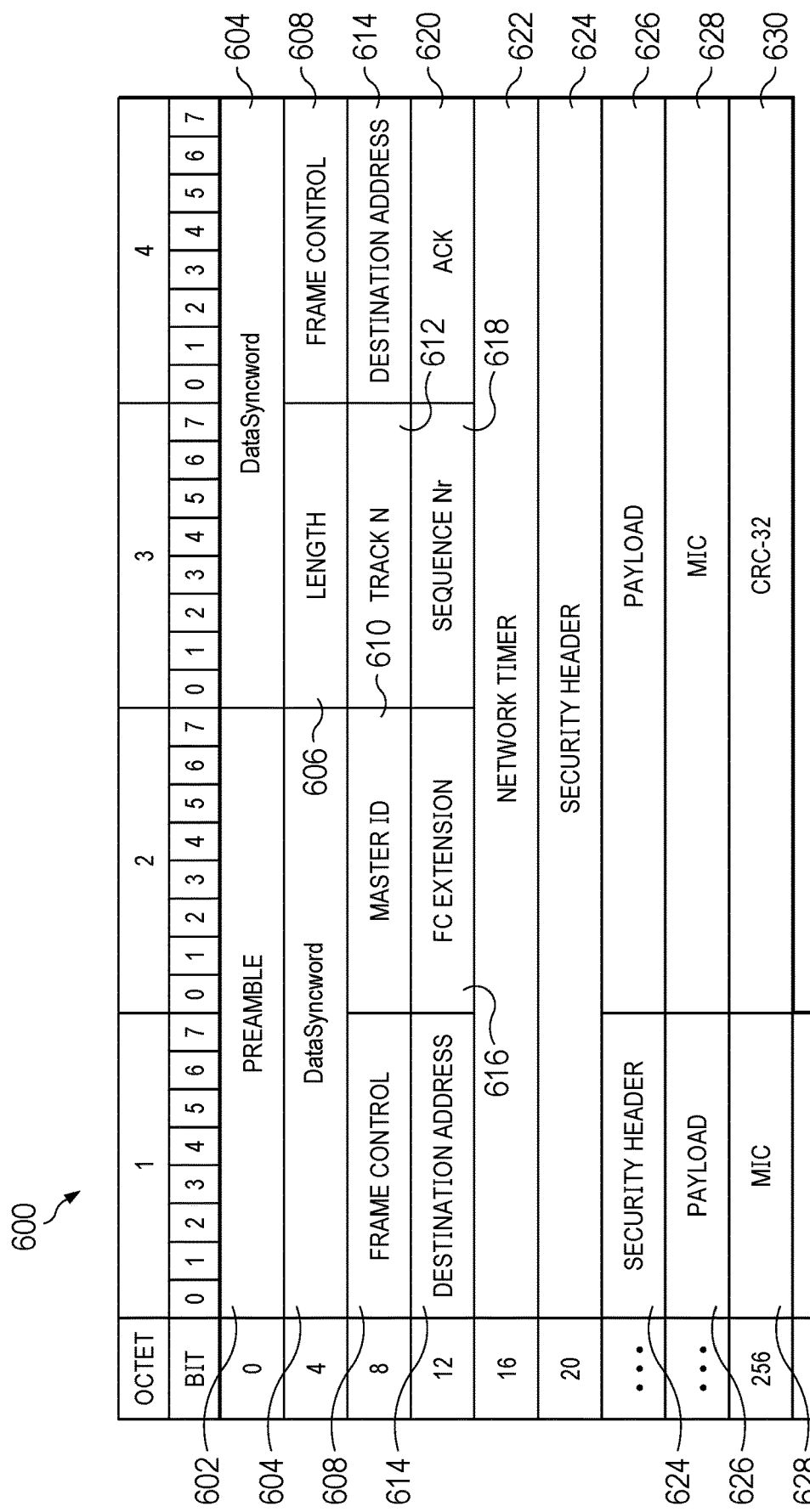
FIG. 6 is an illustration of a downlink protocol format usable by a wireless battery management system according to various examples.

FIG. 6 illustrates an example DL protocol format 600 usable by a wireless battery management system, e.g., the wireless battery management system 100. The top row of the DL protocol format 600 labeled as "Octet" represents the octet identifier to assist in describing the format of the DL protocol format 600. In the DL protocol format 600 there are four octets in the protocol representation, each octet with eight bits. The second row of the DL protocol format 600 labeled as "Bit" identifies the bit number of each of the octets to assist in describing the format of the DL protocol format 600. The numbers on the far left of the DL protocol format 600 represent the number of octets prior to the immediate row. For example, the fourth row of the DL protocol format 600 indicates that four octets precede the subsequent octets. As shown, the DL protocol format 600 includes a preamble 602, a data sync word 604, a length field 606, a frame control 608, a master ID 610, a track N frame 612, a destination address (destination addr) frame 614, a frame control extension (FC extension) 616, a sequence number (sequence nr) 618, an ACK 620, a network timer 622, a security header 624, a payload 626, a message integrity code (MIC) field 628, and a 32-bit cyclic redundancy check (CRC-32) 630. The DL protocol format 600 is an example of a DL protocol format and additional fields and/or format types that may be used for a wireless battery management system protocol to accommodate different features.

The DL protocol format 600 is used by a wireless battery management system to wirelessly communicate battery management information. For example, the DL protocol format 600 may be used by the primary network node to instruct the secondary network nodes to pair with the primary network node for battery management purposes. In another example, the DL protocol format 600 may be used in a DL frame as discussed with respect to FIG. 3, after the primary network node scans a network as discussed with respect to FIG. 4A and pairs with the secondary network nodes as discussed with respect to FIG. 4B.

In an example, the preamble 602 and the data sync word 604 are used by the primary network node and the secondary network nodes to detect the beginning of a frame of a data packet being transmitted between the primary network node and the secondary network nodes. The preamble 602 is used to synchronize a data transmission between the primary network node and the secondary network nodes by indicating a start of header information of a data frame, the end of the header information, and the start of a data payload. Here, the data frame is in reference to the entire frame of the DL protocol format 600. The data sync word 604 is used for synchronizing data and configuration channels between the primary network node and the secondary network nodes. The data sync word 604 includes a configuration code that specifies a frequency channel for the primary network node and each of the secondary network nodes to communicate. The length field 606 indicates the length of the data frame. The frame control 608 includes information about the type of the packet being sent. In an example, the type of the packet may be a scan request, a scan response, a pairing request, a pairing response, or the like.

In an example, the master ID 610 is the identifier for the primary network node that the secondary network nodes use to identify the primary network node. The track N frame 612 identifies which transceiver of the primary network node is communicating with the secondary network nodes. The destination address frame 614 indicates the destination address of a recipient of the communication. For example, when communication is in a broadcast manner, each of the secondary network nodes has the same destination address such that the destination address frame 614 applies to all of the secondary network nodes. The frame control extension 616 indicates whether, and by how much, the frame control 608 is extended. The sequence number 618 indicates whether the current data packet is part of an original transmission from the primary network node to the secondary network nodes or is part of a retransmission from the primary network node to the secondary network nodes. The ACK 620 indicates whether a transmission from the secondary network node to the primary network node is received (e.g., a 1 bit may indicate successful receipt, and a 0 bit may indicate unsuccessful receipt). The ACK 620 may include any suitable number of bits, for example, the number of secondary network nodes communicating with the primary network node. The network timer 622 indicates a common time between the primary network node and the secondary network nodes. The common time is a time signal shared between the primary network node and the secondary network nodes to allow synchronized communication between the primary network node and the secondary network nodes. The network timer 622 is used to synchronize the secondary network nodes based on a timer of the primary network node.

In an example, the security header 624 includes a frame counter and a key refresh control field. The frame counter is an arbitrary number used once for the primary network node to establish cryptographic communication with the secondary network nodes. The key refresh control field is used to indicate, and complete, updating of the security keys that are exchanged between the primary network node and the secondary network nodes. Additional example details of network key generation for BMSs can be found in commonly assigned U.S. patent application Ser. No. 17/314,865, entitled "Key Refreshment with Session Count for Wireless Management of Modular Subsystems," filed on May 7, 2021, which is incorporated by reference in its entirety.

The payload 626 includes the data that is the actual intended message to be sent. For example, the payload 626 may include information regarding battery management from the primary network node to the secondary network node. The MIC field 628 is used to confirm the frame is from the stated sender (e.g., the authenticity of the frame) and has not been changed. The MIC field 628 protects data integrity of the frame, as well as its authenticity, by allowing the primary network node and the secondary network nodes to detect any changes to the content of the frame. The CRC-32 630 is used for error detection in the frame the payload 626 is encrypted. The CRC-32 630 detects accidental changes to raw data of the frame by comparing values based on a mathematical function performed on all or part of the content of the data frame, such as the remainder of polynomial division of contents of the data frame.

Figure 7:
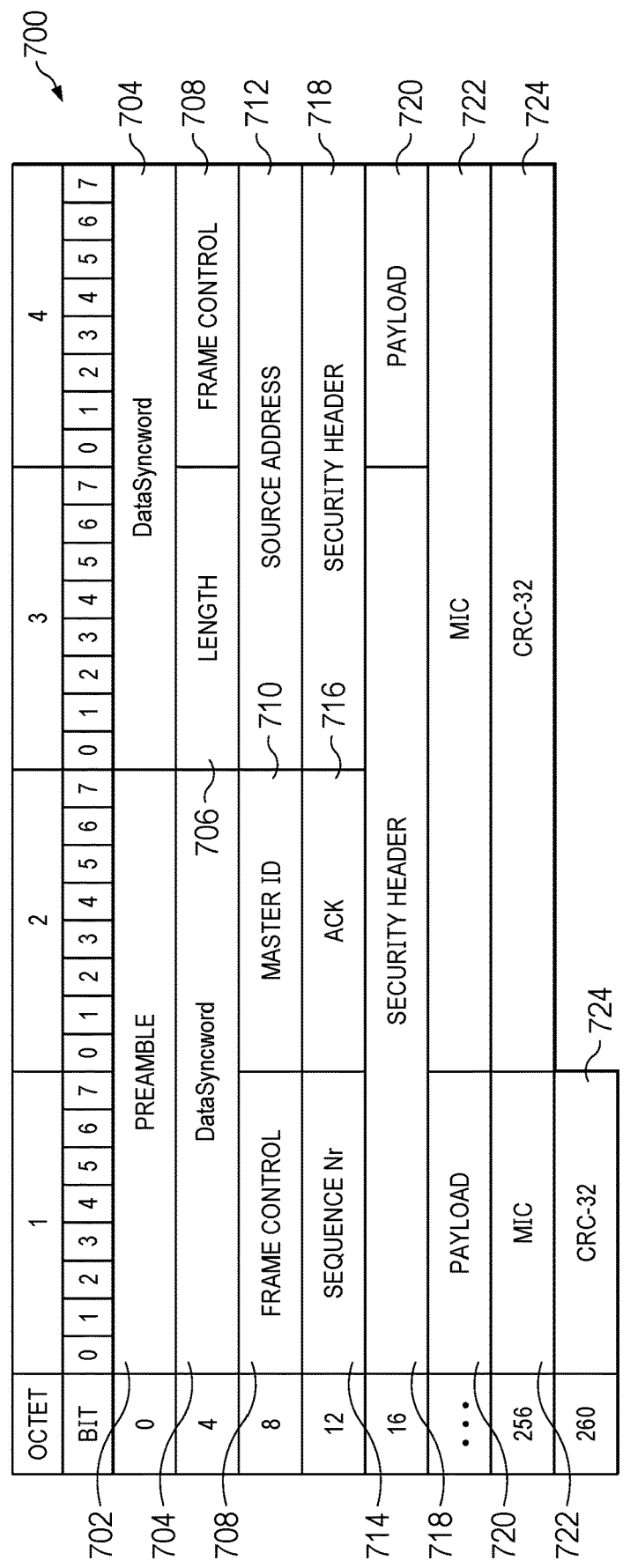
FIG. 7 is an illustration of an uplink protocol format usable by a wireless battery management system according to various examples.

FIG. 7 illustrates a UL protocol format 700 used by a wireless battery management system, e.g., the wireless battery management system 100. The top row of the UL protocol format 700 labeled as "Octet" represents the octet identifier to assist in describing the format of the UL protocol format 700. In the UL protocol format 700 there are four octets in the protocol representation, each octet with eight bits. The second row of the UL protocol format 700 labeled as "Bit" identifies the bit number of each of the octets to assist in describing the format of the UL protocol format 700. The numbers on the far left of the UL protocol format 700 represent the number of octets prior to the immediate row. For example, the fourth row of the UL protocol format 700 indicates that four octets come before the subsequent octets. As shown, the UL protocol format 700 includes a preamble 702, a data sync word 704, a length field 706, a frame control 708, a master ID 710, a source address frame 712, a sequence number (sequence nr) 714, an ACK 716, a security header 718, a payload 720, a MIC field 722, and a CRC-32 724. The UL protocol format 700 is an example of a UL protocol format and additional fields and/or format types that may be used for a wireless battery management system protocol to accommodate different features.

The UL protocol format 700 is used by a wireless battery management system for the primary network node and the secondary network nodes to wirelessly communicate battery management information. For example, the UL protocol format 700 may be used by the primary network node to instruct the secondary network nodes to pair with the primary network node for battery management purposes. In another example, the UL protocol format 700 may be used in a UL frame as discussed with respect to FIG. 3, after the primary network node scans a network as discussed with respect to FIG. 4A and pairs with the secondary network nodes as discussed with respect to FIG. 4B.

In an example, the preamble 702 and the data sync word 704 are used by the primary network node and the secondary network nodes to detect the beginning of a frame of a data packet being transmitted between the secondary network nodes and the primary network node. The preamble 702 is used to synchronize a data transmission between the secondary network nodes and the primary network node by indicating a start of header information of a data frame, the end of the header information, and the start of a data payload. Here, the data frame is the entire frame of the UL protocol format 700. The data sync word 704 is used for synchronizing data and configuration channels between the secondary network nodes and the primary network node. The data sync word 704 includes a configuration code that specifies a frequency channel for each of the secondary network nodes and the primary network node to communicate. The length field 706 indicates the length of the data frame. The frame control 708 includes information about the type of the packet being sent. In an example, the type of the packet may be a scan request, a scan response, a pairing request, a pairing response, or the like.

In an example, the master ID 710 is the identifier for the primary network node that the secondary network nodes use to identify the primary network node. The source address frame 712 indicates an address assigned by the primary network node to the secondary network nodes. For example, when data is broadcast, each of the secondary network nodes transmits a UL to the primary network node from different source addresses such that the source address frame 712 is unique to each of the secondary network nodes. The sequence number 714 indicates whether the current data packet is part of an original transmission from the primary network node to the secondary network nodes or is part of a retransmission from the primary network node to the secondary network nodes. The ACK 716 indicates whether transmission from the primary network node to the secondary network nodes is received. The ACK 716 may be a single bit, which is set to 1 when the DL from the primary network node is successfully received (or remains at 0 when unsuccessful).

In an example, the security header 718 includes a frame counter and a key refresh control field. The frame counter is an arbitrary number used once for the primary network node to establish cryptographic communication with the secondary network nodes. The key refresh control field is used to indicate, and complete, updating of the security keys that are exchanged between the primary network node and the secondary network nodes. The payload 720 includes the data that is the actual intended message to be sent. For example, the payload 720 may include information regarding battery cell health from the secondary network nodes to the primary network node. The MIC field 722 is used to confirm the frame is from the stated sender (its authenticity) and has not been changed. The MIC field 722 protects data integrity of the frame, as well as its authenticity, by allowing the primary network node and the secondary network nodes to detect any changes to the content of the frame. The CRC-32 724 is used for error detection in the frame the payload 720 is encrypted. The CRC-32 724 detects accidental changes to raw data of the frame by comparing values based on a mathematical function performed on all or part of the content of the data frame, such as the remainder of polynomial division of contents of the frame.

As described above, it may be beneficial for the primary network node 102 to determine the time at which a secondary network node, such as secondary network node 206, generated a given packet that is transmitted to the primary network node 102. Although the time of packet receipt by the primary network node 102 may be negatively influenced by wireless communications, the time of packet generation is not susceptible to such deleterious influences. Accordingly, the time of packet generation provides a more accurate perception of the behavior of the WBMS 100. The secondary network nodes 206, 210 may be configured to provide information to the primary network node 102 that is usable by the primary network node 102 to determine the time that a given packet was generated, as is now described.

Figure 8:
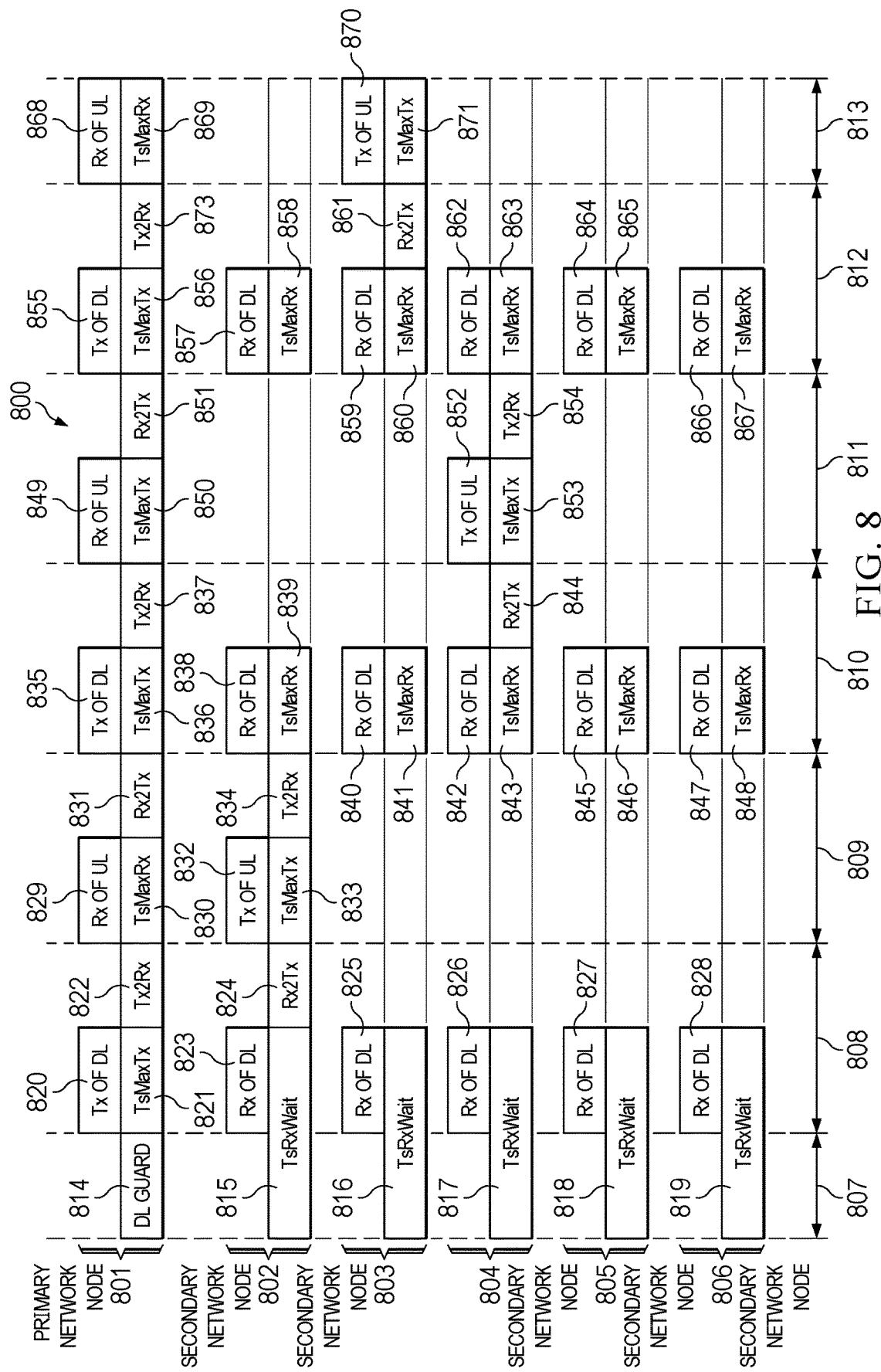
Figure 9B:
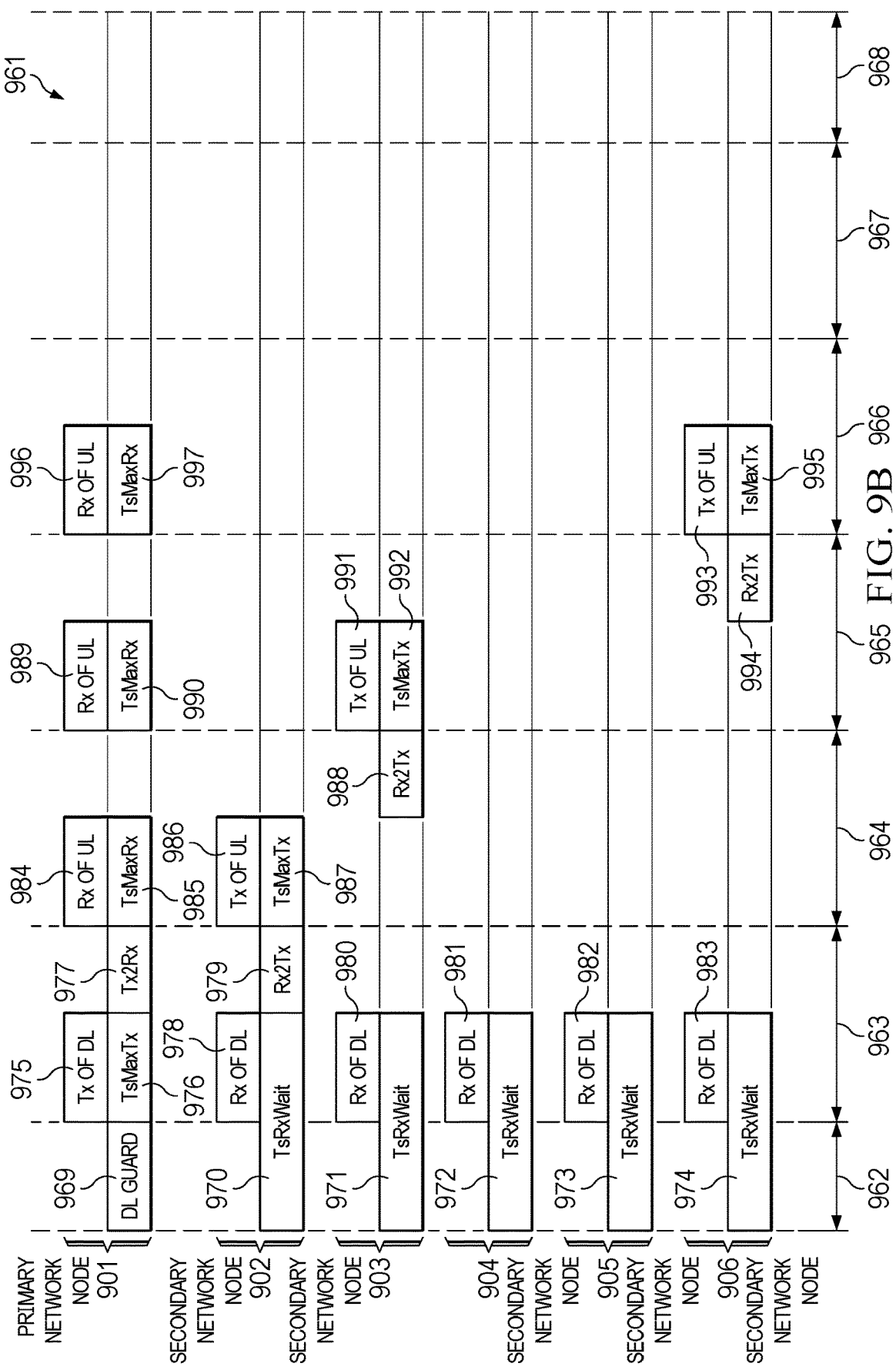
Figure 10:
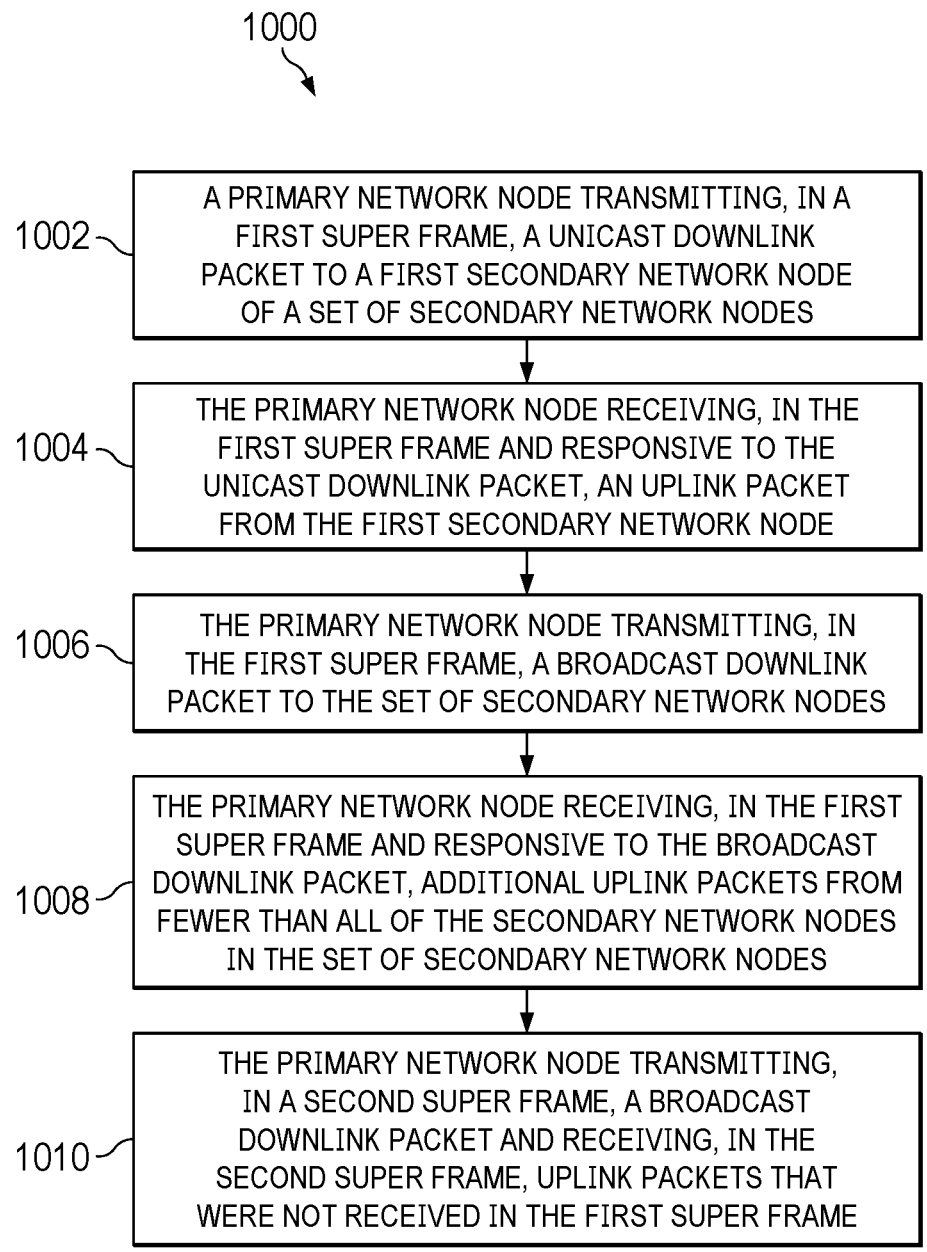
FIGS. 10 and 11 are flow diagrams of methods for operating a wireless battery management system according to various examples.
Figure 11:
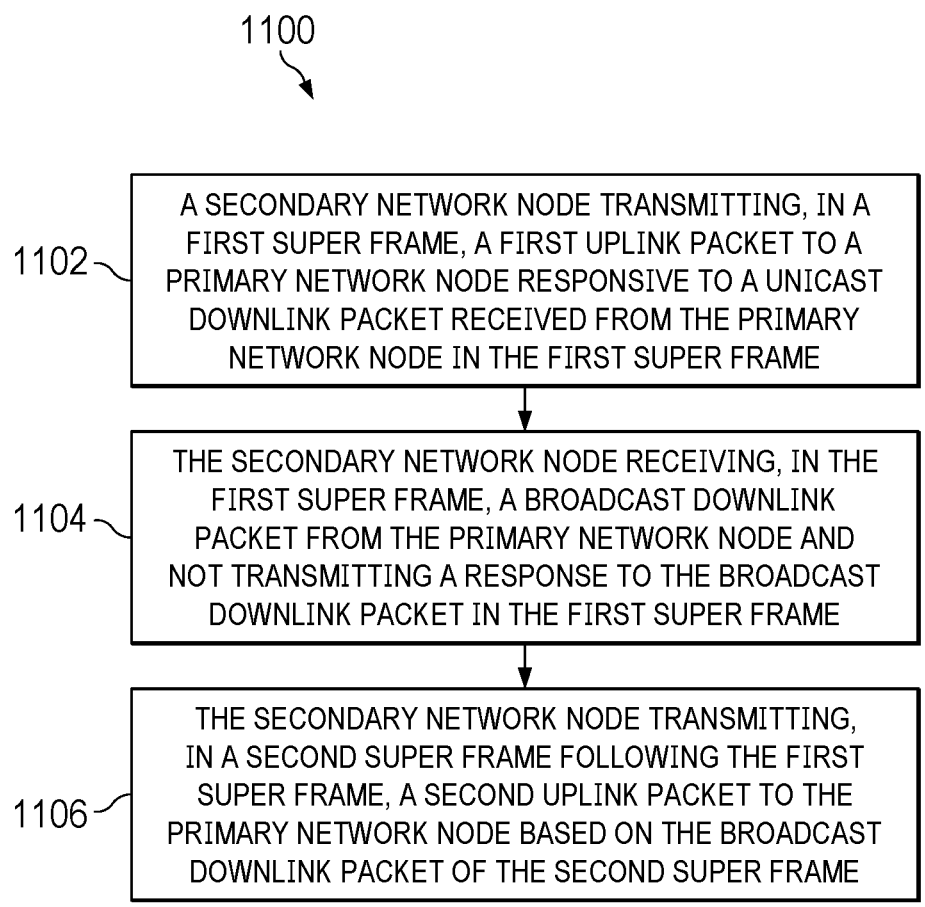

FIGS. 8, 9A, and 9B are illustrations of super frame intervals usable by a wireless battery management system according to various examples. Specifically, FIG. 8 illustrates the transmission of multiple unicasts (and responses thereto by secondary network nodes) in a single super frame, while FIGS. 9A and 9B illustrate the transmission of a unicast (and responses thereto by secondary network nodes) in a single super frame and the transmission of a broadcast (and responses thereto by secondary network nodes) distributed across multiple super frames. Although FIGS. 8, 9A, and 9B illustrate a super frame interval for five secondary network nodes, the techniques may be implemented in a battery management system with any number of secondary network nodes. FIGS. 10 and 11 are flow diagrams of example methods for operating primary network nodes and secondary network nodes, respectively, to implement the super frame communications depicted in FIGS. 9A and 9B. FIG. 8 is described first, followed by a parallel description of FIGS. 9A, 9B, 10, and 11. FIGS. 8-11 are described in the context of a wireless battery management system having a primary network node and multiple secondary network nodes, such as the example wireless battery management system 200 of FIG. 2A. Other wireless battery management systems, such as systems 100 and 250 shown in FIGS. 1 and 2B, can implement the techniques depicted in FIGS. 8-11.

FIG. 8 depicts a super frame 800. The super frame 800 is usable for the primary network node 801 to communicate with secondary network nodes 802-806. The super frame 800 includes slots 807-813. The super frame 800 depicts the efficient implementation of unicast communications because, as described in greater detail below, the primary network node 801 uses slot 808 to transmit a unicast downlink packet and the secondary network node 802 uses slot 809 to transmit a response uplink packet. Rather than the remaining slots 810-813 go unused, the primary network node 801 uses the slot 810 to transmit a unicast downlink packet and the secondary network node 804 uses the slot 811 to transmit a response uplink packet. Similarly, the primary network node 801 uses the slot 812 is used to transmit a unicast downlink packet and the secondary network node 803 uses the slot 813 is used to transmit a response uplink packet.

The slot 807 begins with a downlink (DL) guard 814, one purpose of which is described above with reference to FIG. 5. Also during slot 807, the secondary network nodes 802-806 undergo receive wait times 815-819, respectively. In slot 808, the primary network node 801 transmits a unicast downlink packet 820 during a DL transmit time frame 821, which is followed by a transmit to receive frame 822 in preparation for the primary network node 801 transitioning from a transmit mode to a receive mode as slot 808 transitions to slot 809. Also during slot 808, the secondary network nodes 802-806 receive the unicast downlink packet 820, as numerals 823 and 825-828 indicate. The secondary network node 802 undergoes a receive to transmit frame 824 in preparation for the secondary network node 802 transitioning from a receive mode to a transmit mode as slot 808 transitions to slot 809.

In slot 809, the secondary network node to which the unicast downlink packet 820 was addressed responds to the primary network node 801 with an uplink packet. In examples, uplink packets may be unicast packets. In the example of FIG. 8, the unicast downlink packet 820 is addressed to the secondary network node 802. Accordingly, in slot 809, the secondary network node 802 transmits an uplink packet 832 to the primary network node 801, which receives the uplink packet 832, as numeral 829 indicates. During slot 809, the primary network node 801 undergoes a UL receive time frame 830 to facilitate receipt of the uplink packet 832 and a receive to transmit frame 831. Also during slot 809, the secondary network node 802 undergoes a UL transmit time frame 833 and a transmit to receive frame 834. During slot 809, the secondary network nodes 803-806 do not transmit or receive packets.

If either the unicast downlink packet 820 or the uplink packet 832 fails, the primary network node 801 may be configured to retransmit the unicast downlink packet 820 in slot 810, rather transmitting the unicast downlink packet 835 as shown in FIG. 8. In other words, if the secondary network node 802 fails to receive the unicast downlink packet 820 during slot 808, the secondary network node 802 will not transmit uplink packet 832 during slot 809. If the secondary network node 802 receives the unicast downlink packet 820 and responds by transmitting the uplink packet 832 during slot 809, the primary network node 801 may nevertheless fail to receive the uplink packet 832 during slot 809. In either case, the primary network node 801 may be configured to retransmit the unicast downlink packet 820 in slot 810, rather transmitting the unicast downlink packet 835 as shown in FIG. 8.

In slot 810, the primary network node 801 transmits another unicast downlink packet 835, and then the primary network node 801 undergoes a DL transmit time frame 836 and a transmit to receive frame 837. Also in slot 810, the secondary network nodes 802-806 receive the unicast downlink packet 835, as numerals 838, 840, 842, 845, and 847 indicate. During receipt of the unicast downlink packet 835, the secondary network node 802 undergoes a DL receive time frame 839, the secondary network node 803 undergoes a DL receive time frame 841, the secondary network node 804 undergoes a DL receive time frame 843 and a receive to transmit frame 844, the secondary network node 805 undergoes a DL receive time frame 846, and the secondary network node 806 undergoes a DL receive time frame 848. In slot 811, the secondary network node 804 (to which the unicast downlink packet 835 was addressed) transmits an uplink packet 852 to the primary network node 801, and the primary network node 801 receives the uplink packet 852, as numeral 849 indicates. Also in slot 811, the primary network node 801 undergoes an UL receive time frame 850 and a receive to transmit frame 851, while the secondary network node 804 undergoes an UL transmit time frame 853 and a transmit to receive frame 854.

In slot 812, another unicast downlink packet 855 is transmitted by the primary network node 801, which undergoes a DL transmit time frame 856 and a transmit to receive frame 873. Also in slot 812, the secondary network nodes 802-806 receive the unicast downlink packet 855, as numerals 857, 859, 862, 864, and 866 indicate. During receipt of the unicast downlink packet 855, the secondary network node 802 undergoes a DL receive time frame 858, the secondary network node 803 undergoes a DL receive time frame 860 and a receive to transmit frame 861, the secondary network node 804 undergoes a DL receive time frame 863, the secondary network node 805 undergoes a DL receive time frame 865, and the secondary network node 806 undergoes a DL receive time frame 867. In slot 813, the secondary network node 803 (to which the unicast downlink packet 855 was addressed) transmits an uplink packet 870 to the primary network node 801, and the primary network node 801 receives the uplink packet 870, as numeral 868 indicates. Also in slot 813, the primary network node 801 undergoes a UL receive time frame 869, while the secondary network node 803 undergoes a UL transmit time frame 871.

Thus, as FIG. 8 shows, the primary network node 801 may transmit unicast downlink packets in slots 808, 810, and 812, and in slots 809, 811, and 813, the secondary network nodes 802, 804, and 803, respectively, may transmit uplink packet responses to the primary network node 801. In this manner, super frames may be useful to transmit unicast communications while mitigating waste of super frame slots, thereby mitigating inefficiencies associated with unicast super frame communications.

FIGS. 9A, 9B, 10, and 11 are described in parallel. FIG. 9A illustrates a super frame 900 useful for exchanging packets between a primary network node 901 and secondary network nodes 902-906. FIG. 9B illustrates a super frame 961 useful for exchanging packets between the primary network node 901 and secondary network nodes 902-906. In examples, the super frames 900 and 961 are consecutive, with super frame 961 occurring immediately after super frame 900 with no intervening super frames between super frames 900 and 961. The super frame 900 may include slots 907-913, and the super frame 961 may include slots 962-968. FIGS. 9A and 9B depict the efficient transmission of unicast packets in super frames. Specifically, the super frames 900, 961 of FIGS. 9A and 9B depict the transmission of a unicast downlink packet in slot 908 and the transmission of an uplink packet in slot 909. Rather than leaving the remainder of the super frame unused, which would be inefficient, the primary network node 901 transmits a broadcast downlink packet 935 in slot 910, and the secondary network nodes 904-906 transmit uplink packets in slots 911-913. In slot 963, the primary network node 901 transmits another broadcast downlink packet that is almost identical (e.g., including payloads) to the broadcast downlink packet of slot 910 (e.g., except for the ACK field), and in slots 964-966, the secondary network nodes 902, 903, and 906 transmit uplink packets in response to the broadcast downlink packet of slot 963. In this way, unicast and broadcast communications are flexibly distributed across multiple super frames to minimize the occurrence of unused super frame slots, thereby mitigating inefficiencies associated with unicast communications in super frames.

A method 1000 begins with a primary network node transmitting, in a first super frame, a unicast downlink packet to a first secondary network node of a set of secondary network nodes (1002). A method 1100 begins with a secondary network node receiving the unicast downlink packet from the primary network node and, responsive to the unicast downlink packet and in the first super frame, transmitting a first uplink packet to the primary network node (1102). Slot 907 depicts a DL guard frame 914 and receive wait times 915-919. Slot 908 depicts the transmission of a unicast downlink packet 920 by the primary network node 901, which undergoes a DL transmit time frame 921 and a transmit to receive frame 922. Also in slot 908, the secondary network nodes 902-906 receive the unicast downlink packet 920, as numerals 923 and 925-928 indicate, and secondary network node 902 undergoes a receive to transmit frame 924. In the example shown in FIG. 9A, the primary network node 901 directs or addresses the unicast downlink packet 920 to the secondary network node 902. The secondary network node 902 may be configured to determine, based on data within the unicast downlink packet 920, that the unicast downlink packet 920 is addressed to the secondary network node 902. Each of the secondary network nodes 903-906 may be configured to determine, based on data within the unicast downlink packet 920, that the unicast downlink packet 920 is not addressed to them (i.e., not addressed to the respective secondary network node making the determination). In slot 909, the secondary network node 902 may transmit an uplink packet 932 to the primary network node 901. The method 1000 includes the primary network node receiving, in the first super frame and responsive to the unicast downlink packet, an uplink packet from the first secondary network node (1004). The primary network node 901 receives the uplink packet 932, as numeral 929 indicates. In slot 909, the secondary network node 902 undergoes a UL transmit time frame 933 and a transmit to receive frame 934. Also in slot 909, the primary network node 901 undergoes a UL receive time frame 930 and a receive to transmit frame 931. In response to determining that the unicast downlink packet 920 is not addressed to them, each of the secondary network nodes 903-906 may be configured to refrain from generating and transmitting an uplink packet for the unicast downlink packet 920.

The method 1000 includes the primary network node transmitting, in the first super frame, a broadcast downlink packet to the set of secondary network nodes (1006). In slot 910, the primary network node 901 transmits a broadcast downlink packet 935 and undergoes a DL transmit time frame 936 and a transmit to receive frame 937. The method 1100 includes the secondary network node receiving, in the first super frame, a broadcast downlink packet from the primary network node and not transmitting a response to the broadcast downlink packet in the first super frame (1104). In slot 910, the secondary network nodes 902-906 receive the broadcast downlink packet 935, as numerals 938, 940, 942, 945 and 947 indicate. Also in slot 910, the secondary network nodes 902-906 undergo DL receive time frames 939, 941, 943, 946, and 948. Secondary network node 904 undergoes a receive to transmit frame 944. In slot 911, the secondary network node 902, which transmitted an uplink packet in slot 909 (1102), does not transmit a response uplink packet to the broadcast downlink packet (1104). Rather, secondary network node 904 transmits an uplink packet 951 while undergoing a UL transmit time frame 952.

As discussed in further detail below, the transmission of uplink packet 951 by the secondary network node 904 in slot 911 is consistent with the uplink packet transmission schedule that would have been in effect had the super frame 900 begun with the transmission of the broadcast downlink packet 935 instead of the unicast downlink packet 920. This schedule may be referred to as the default uplink packet transmission schedule. The secondary network node 904 may be configured to determine that slot 911 is assigned to secondary network node 904 under this default uplink packet transmission schedule. In response to making this determination, the secondary network node 904 may be configured to transmit the uplink packet 951 during slot 911. The secondary network node 905 may be configured to determine that slot 912 is assigned to secondary network node 905 under the default uplink packet transmission schedule. In response to making this determination, the secondary network node 905 may be configured to transmit the uplink packet 956 during slot 912. The secondary network node 906 may be configured to determine that slot 913 is assigned to secondary network node 906 under this default uplink packet transmission schedule. In response to making this determination, the secondary network node 906 may be configured to transmit the uplink packet 959 during slot 913. Thus, in colloquial terms, the secondary network nodes 904-906 may know that they are up to bat in slots 911-913 according to the default schedule.

The secondary network nodes 902 and 903 may be configured to refrain from transmitting a response to the broadcast downlink packet 935 during super frame 900 in response to determining that their default time slots 908 and 909 have already passed or occurred. For example, the secondary network node 902 receives the broadcast downlink packet 935 and may be configured to determine that the secondary network node 902 is scheduled to respond in slot 908 according to a default schedule. However, the secondary network node 902 determines that slot 908 has already occurred by the time that the secondary network node 902 receives the broadcast downlink packet 935. Thus, the secondary network node 902 refrains from transmitting a response to the broadcast downlink packet 935 during super frame 900. Likewise, the secondary network node 903 may be configured to determine that its default time slot (e.g., slot 909) has already occurred by the time that the secondary network node 903 receives the broadcast downlink packet 935. Thus, the secondary network node 903 refrains from transmitting a response to the broadcast downlink packet 935 during super frame 900.

The method 1000 includes the primary network node receiving, in the first super frame and responsive to the broadcast downlink packet, additional uplink packet(s) from fewer than all of the secondary network nodes in the set of secondary network nodes (1008). For example, the primary network node 901 receives the uplink packet 951 from the secondary network node 904, as numeral 949 indicates. Also in slot 911, the primary network node 901 undergoes a UL receive time frame 950, and the secondary network node 905 undergoes a receive to transmit frame 953. Other secondary network nodes may transmit response uplink packets to the primary network node (1008). For example, in slot 912, the secondary network node 905 may transmit an uplink packet 956 and undergo a UL transmit time frame 957. Also in slot 912, primary network node 901 receives the uplink packet 956, as numeral 954 indicates, and the primary network node 901 also undergoes a UL receive time frame 955. Further, in slot 912, the secondary network node 906 undergoes a receive to transmit frame 958. In slot 913, the secondary network node 906 may transmit an uplink packet 959 and undergo a UL transmit time frame 960. Although it is possible for the primary network node 901 to receive the uplink packet 959 in slot 913, in this example, the uplink packet 959 is depicted as being lost or dropped during transmission such that the primary network node 901 does not receive the uplink packet 959.

The method 1000 includes the primary network node transmitting, in a second super frame, a broadcast downlink packet and receiving, in the second super frame, uplink packets that were not received in the first super frame (1010). For example, in the context of FIGS. 9A and 9B, the broadcast downlink packet 935 was received by all of the secondary network nodes 902-906, but because only three slots (911-913) remained in the super frame 900, not all of the secondary network nodes 902-906 could transmit response uplink packets to the primary network node 901. Accordingly, in slot 911, the secondary network node 904 transmitted its uplink packet; in slot 912, the secondary network node 905 transmitted its uplink packet; and in slot 913, the secondary network node 906 transmitted its uplink packet. The transmission of these specific uplink packets in slots 911-913 is consistent with the uplink packet transmission schedule that would have been in effect had the super frame 900 begun with the transmission of the broadcast downlink packet 935 instead of the unicast downlink packet 920. Stated another way, the transmission of these specific uplink packets in slots 911-913 is consistent with the uplink packet transmission scheme depicted in the super frame 500 of FIG. 5. However, under this scheme, the secondary network nodes 902 and 903 do not have an opportunity to transmit their uplink packets in super frame 900. Accordingly, in examples, the secondary network nodes 902 and 903 transmit their uplink packets in super frame 961, which is the next consecutive super frame after super frame 900. Further, if any uplink packets transmitted by secondary network nodes in super frame 900 are not received by the primary network node 901 (e.g., due to being dropped), such uplink packets may be re-transmitted in the super frame 961. To trigger the transmission of uplink packets by secondary network nodes 902 and 903 and to trigger the re-transmission of dropped uplink packet 959 by secondary network node 906, the primary network node transmits, in the second super frame, a broadcast downlink packet that is virtually identical to the broadcast downlink packet most recently transmitted in the preceding super frame (1010), except as described below. In response to this broadcast downlink packet transmitted in the second super frame, the secondary network node transmits, in the second super frame, an uplink packet to the primary network node (1106). The primary network node receives, in the second super frame, the uplink packet transmitted by the secondary network node in 1106 as well as any other uplink packets that may be transmitted in the second super frame that were not transmitted in the first super frame (1010).

In the example of FIGS. 9A and 9B, slot 962 includes a DL guard 969 and receive wait times 970-974. In slot 963, the primary network node 901 transmits a broadcast downlink packet 975 and undergoes a DL transmit time frame 976 and a transmit to receive frame 977. Also in slot 963, the secondary network nodes 902-906 receive the broadcast downlink packet 975, as numerals 978 and 980-983 indicate. The broadcast downlink packet 975 may be partially or fully identical to the broadcast downlink packet 935 of super frame 900, except that the acknowledgement code (ACK) of the broadcast downlink packet 975 may indicate which uplink packets were received by the primary network node 901 in the super frame 900 responsive to the broadcast downlink packet 935. For example, because there are five secondary network nodes 902-906, the ACK may be a five-bit code, with each bit indicating whether the uplink packet of a corresponding secondary network node 902-906 was received in super frame 900. In examples, the most significant bit of the ACK may correspond to the secondary network node 902, the second most significant bit of the ACK may correspond to the secondary network node 903, the third most significant bit of the ACK may correspond to the secondary network node 904, the fourth most significant bit of the ACK may correspond to the secondary network node 905, and the least significant bit of the ACK may correspond to the secondary network node 906. In super frame 900, only the uplink packets of secondary network nodes 904 and 905 were received by the primary network node 901, as described above. Thus, the ACK in the broadcast downlink packet 975 may be 00110, with the two "1" bits corresponding to the received uplink packets for secondary network nodes 904 and 905 and the three "0" bits corresponding to the non-receipt of the uplink packets for secondary network nodes 902, 903, and 906. The secondary network node 902 also undergoes a receive to transmit frame 979.

In slot 964, the secondary network node 902—which did not have an opportunity to transmit its uplink packet in super frame 900—transmits its uplink packet 986 responsive to the ACK of broadcast downlink packet 975 indicating that the uplink packet for secondary network node 902 was not received in super frame 900. The secondary network node 902 also undergoes a UL transmit time frame 987. Also in slot 964, the primary network node 901 receives the uplink packet 986 as numeral 984 indicates, and the primary network node 901 also undergoes a UL receive time frame 985. Also in slot 964, the secondary network node 903 undergoes a receive to transmit frame 988.

In slot 965, the secondary network node 903—which did not have an opportunity to transmit its uplink packet in super frame 900—transmits its uplink packet 991 responsive to the ACK of broadcast downlink packet 975 indicating that the uplink packet for secondary network node 903 was not received in super frame 900. The secondary network node 903 also undergoes a UL transmit time frame 992. Further, in slot 965, the primary network node 901 receives the uplink packet 991 as numeral 989 indicates, and the primary network node 901 also undergoes a UL receive time frame 990. In slot 965, the secondary network node 906 undergoes a receive to transmit frame 994.

In slot 966, the secondary network node 906—whose uplink packet 959 was dropped in super frame 900—transmits an uplink packet 993 responsive to the ACK of broadcast downlink packet 975 indicating that the uplink packet 959 for secondary network node 906 was not received in super frame 900. The secondary network node 906 also undergoes a UL transmit time frame 995. Also in slot 966, the primary network node 901 receives the uplink packet 993 as numeral 996 indicates, and the primary network node 901 also undergoes a UL receive time frame 997.

The ACK of the broadcast downlink packet 975 may indicate or establish the sequence and timing with which the secondary network nodes 902-906 transmit the uplink packets of super frame 961 or refrain from transmitting, in the case of secondary network nodes 904 and 905. In the example being described, the ACK is 00110, which indicates that the uplink packets for secondary network nodes 902, 903, and 906 are to be transmitted in the super frame 961. Conversely, the ACK indicates or establishes that the secondary network nodes 904 and 905 are not to transmit uplink packets in the super frame 961. It would be possible to transmit uplink packets in two consecutive frames of the super frame 961 for the secondary network nodes 902 and 903, then transmit nothing for the following two consecutive frames of the super frame 961 (since uplink packets for secondary network nodes 904 and 905 are not to be transmitted again in the super frame 961), and then transmit the uplink packet for the secondary network node 906. However, this scheme would be inefficient, as two of the frames would go unused. Thus, in examples, the uplink packets to be transmitted in the super frame 961 (e.g., uplink packets 986, 991, and 993) are transmitted in consecutive frames without any intervening, unused frames.

In other words, the secondary network nodes 902, 903, and 906 transmit uplink packets 986, 991, and 993 in consecutive slots 964-966 without any intervening, unused slot. For example, the secondary network node 902 may be configured to determine that its bit position (e.g., the first bit) in the ACK is the first zero bit of the ACK and transmit uplink packet 986 during slot 964 in response to making this determination. The secondary network node 903 may be configured to determine that its bit position (e.g., the second bit) in the ACK of the ACK is the second zero bit and transmit uplink packet 991 during slot 965 in response to making this determination. The secondary network node 904 may be configured to determine that its bit position (e.g., the third bit) in the ACK is a one bit and refrain from transmitting an uplink packet during slot 966 in response to making this determination. The secondary network node 905 may be configured to determine that its bit position (e.g., the fourth bit) in the ACK is a one bit and refrain from transmitting an uplink packet during slot 966 or during slot 967 in response to making this determination. The secondary network node 906 may be configured to determine that its bit position (e.g., the fifth bit) in the ACK is the third zero bit of the ACK and transmit uplink packet 993 during slot 966 in response to making this determination. Additionally or alternatively, each of the secondary network nodes 905 and 906 may be configured to select a time slot by determining that two of the bits preceding its bit position in the ACK have a value of one. Thus, each of secondary network nodes 902-906 may be configured to determine whether its respective bit position in the ACK is a zero, determine the number of preceding zeros in the ACK, and select a time slot for transmission based on these determinations.

Subsequently, in slot 967 and onward, another unicast or broadcast downlink signal may be transmitted by the primary network node 901, and the techniques described herein may be repeated. For example, the primary network node 901 may transmit a broadcast downlink packet during slot 967, and in response, the secondary network node 906 may transmit an uplink packet during slot 968. The primary network node 901 may be configured to determine that the ACK sent with the broadcast downlink packet 975 by primary network node 901 indicated that three uplink packets were to be transmitted during slots 964-966. In response to making this determination, and in response to confirming receipt of uplink packets 986, 991, and 993, the primary network node 901 may be configured to transmit a broadcast downlink packet during slot 967 (not shown in FIG. 9B). The secondary network node 906 may be configured to determine that the subsequent time slot (i.e., slot 968) is assigned to secondary network node 906 under the default uplink packet transmission schedule. In response to making this determination, the secondary network node 906 may be configured to transmit, during slot 968, an uplink packet that responds to the broadcast downlink packet received by the secondary network node 906 during slot 967.

The term "couple" is used in the specification. The term may cover connections, communications, or signal paths that enable a functional relationship consistent with this description. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

Unless otherwise stated, "about," "approximately," or "substantially" preceding a value means +/−10 percent of the stated value. Modifications are possible in the described examples, and other examples are possible within the scope of the claims.

What is claimed is:

1. A vehicular battery management system (BMS), comprising:
   a set of battery cells; and
   a secondary network node coupled to the set of battery cells, the secondary network node configured to:
      wirelessly receive, in a first slot of a super frame, a unicast downlink packet from a primary network node, the unicast downlink packet addressed to the secondary network node; and
      wirelessly transmit, in a second slot of the super frame and responsive to the unicast downlink packet, an uplink packet to the primary network node.

2. The BMS of claim 1, wherein the first and second slots are consecutive slots.

3. The BMS of claim 1, wherein the secondary network node is configured to receive, in a third slot of the super frame, another unicast downlink packet from the primary network node, the other unicast downlink packet addressed to another secondary network node coupled to another set of battery cells.

4. The BMS of claim 1, wherein the secondary network node is configured to receive, in a third slot of the super frame, a broadcast downlink packet from the primary network node.

5. The BMS of claim 4, wherein the secondary network node is configured to refrain from transmitting another uplink packet to the primary network node in the super frame in response to the broadcast downlink packet.

6. The BMS of claim 5, wherein the secondary network node is configured to transmit the other uplink packet in a second super frame in response to a second broadcast downlink packet, the second super frame consecutive with the super frame.

7. The BMS of claim 6, wherein the second broadcast downlink packet is transmitted in the second super frame and has a payload identical to that of the broadcast downlink packet.

8. The BMS of claim 6, wherein the secondary network node is configured to transmit the other uplink packet in the second super frame responsive to the second broadcast downlink packet indicating that the other uplink packet was not received from the secondary network node in the super frame.

9. The BMS of claim 5, wherein the secondary network node is configured to:
   determine a time slot in the super frame for the other uplink packet based on a default schedule; and
   determine that the time slot has already occurred in the super frame,
   wherein the secondary network node is configured configurable to, based on determining that the time slot has already occurred in the super frame, refrain from transmitting the other uplink packet to the primary network node in the super frame.

10. A method, comprising: a primary network node transmitting, in a first super frame, a unicast downlink packet to a first secondary network node of a set of secondary network nodes and a broadcast downlink packet to the set of secondary network nodes; the primary network node receiving, in the first super frame and responsive to the unicast downlink packet, an uplink packet from the first secondary network node; and the primary network node receiving, in the first super frame and responsive to the broadcast downlink packet, additional uplink packets from fewer than all of the secondary network nodes in the set of secondary network nodes.

11. The method of claim 10, further comprising the primary network node transmitting, in a second super frame, a second broadcast downlink packet having a payload identical to a payload of the broadcast downlink packet.

12. The method of claim 11, wherein the second broadcast downlink packet includes an acknowledgement code indicating secondary network nodes in the set of secondary network nodes from which uplink packets were not received in the first super frame.

13. The method of claim 12, further comprising the primary network node receiving, in the second super frame, uplink packets from the secondary network nodes identified by the acknowledgement code.

14. The method of claim 13, wherein a timing of the uplink packets received from the secondary network nodes in the second super frame is based on the acknowledgement code.

15. The method of claim 10, wherein a timing of the uplink packets received from the secondary network nodes in the first super frame is based on a default schedule.

16. A method, comprising:
- a secondary network node transmitting, in a first super frame, a first uplink packet to a primary network node responsive to a unicast downlink packet received from the primary network node in the first super frame;
- the secondary network node receiving, in the first super frame, a broadcast downlink packet from the primary network node and not transmitting a response to the broadcast downlink packet in the first super frame; and
- the secondary network node transmitting, in a second super frame following the first super frame, a second uplink packet to the primary network node responsive to the broadcast downlink packet of the second super frame.

17. The method of claim 16, wherein the broadcast downlink packet of the second super frame has a payload identical to that of the broadcast downlink packet of the first super frame.

18. The method of claim 16, further comprising the secondary network node transmitting the second uplink packet in a slot of the second super frame determined based on an acknowledgement code in the broadcast downlink packet of the second super frame.

19. The method of claim 18, wherein the acknowledgement code indicates that the primary network node did not receive the response in the first super frame.

20. The method of claim 16, further comprising:
- determining a time slot in the first super frame for the second uplink packet based on a default schedule; and
- determining that the time slot has already occurred in the first super frame,
- wherein not transmitting the response to the broadcast downlink packet in the first super frame is based on determining that the time slot has already occurred in the first super frame.

* * * * *